(12) United States Patent
Sun et al.

(10) Patent No.: US 12,308,686 B2
(45) Date of Patent: May 20, 2025

(54) CHARGE CONTROL METHOD, CHARGE CONTROL APPARATUS AND STORAGE MEDIUM

(71) Applicant: Beijing Xiaomi Mobile Software Co., Ltd., Beijing (CN)

(72) Inventors: Changyu Sun, Beijing (CN); Hang Ren, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 759 days.

(21) Appl. No.: 17/645,416

(22) Filed: Dec. 21, 2021

(65) Prior Publication Data

US 2022/0393496 A1 Dec. 8, 2022

(30) Foreign Application Priority Data

Jun. 7, 2021 (CN) .......................... 202110633646.3

(51) Int. Cl.
*H01M 10/46* (2006.01)
*H02J 7/00* (2006.01)

(52) U.S. Cl.
CPC ...... *H02J 7/00712* (2020.01); *H02J 7/00034* (2020.01); *H02J 7/00045* (2020.01)

(58) Field of Classification Search
CPC ............... H02J 7/00045; H02J 7/00712; H02J 7/00034; H02J 7/00032; H02J 7/00036; H02J 7/00047; H02J 13/00026; H02J 13/00001; H02J 13/00006
USPC .......................... 320/103, 106, 107, 125, 160
See application file for complete search history.

(56) References Cited

U.S. PATENT DOCUMENTS

| | | | |
|---|---|---|---|
| 9,948,118 B1* | 4/2018 | Patton | H02J 7/0071 |
| 10,790,676 B2 | 9/2020 | Chen et al. | |
| 2016/0370835 A1 | 12/2016 | Erickson et al. | |
| 2019/0260212 A1 | 8/2019 | Li et al. | |
| 2022/0131395 A1* | 4/2022 | Chen | H02J 7/00045 |
| 2023/0120651 A1* | 4/2023 | Chen | H02J 7/00712 |
| | | | 320/137 |

FOREIGN PATENT DOCUMENTS

| | | |
|---|---|---|
| CN | 111900780 A | 11/2020 |
| CN | 112448423 A | 3/2021 |

OTHER PUBLICATIONS

"Mobile terminal integration fast charging technical specification" TAF Website, T/TAF 083-2021, Available Online at https://www.taf.org.cn/upload/AssociationStandard/TTAF%20083-2021%20%E7%A7%BB%E5%8A%A8%E7%BB%88%E7%AB%AF%E8%9E%8D%E5%90%88%E5%BF%AB%E9%80%9F%E5%85%85%E7%94%B5%E6%8A%80%E6%9C%AF%E8%A7%84%E8%80%83.pdf, May 28 2021, 75 pages. (Submitted as Machine Translation of Original Document).

* cited by examiner

*Primary Examiner* — Edward Tso
(74) *Attorney, Agent, or Firm* — McCoy Russell LLP

(57) ABSTRACT

A charge control method can include: in response to connection with a charge device, selecting a charge protocol; when the selected charge protocol is a universal fast charge specification, determining a charge control strategy matching the universal fast charge specification, and charging the charge device based on the charge control strategy.

17 Claims, 12 Drawing Sheets

CHARGE CONTROL METHOD, CHARGE CONTROL APPARATUS AND STORAGE MEDIUM

CROSS REFERENCE TO RELATED APPLICATION

The present application claims priority to Chinese Patent Application No. 202110633646.3, filed on Jun. 7, 2021. The entire contents of the above-listed application are hereby incorporated by reference for all purposes.

BACKGROUND

With the advance in science and technology and popularization of mobile terminals, the capacity of batteries of the terminals is increasing, and the requirements of the market for fast charge are increasingly stronger. For fast charge technical protocols for the mobile terminals, specific manufacturers define their own fast charge technical protocols, such as: a fast charge protocol (FCP), a super charge protocol (SCP), a quick charger protocol and a pump express protocol.

SUMMARY

The disclosure relates to the technical field of charging, in particular to a charge control method, a charge control apparatus and a storage medium.

According to a first aspect of examples of the disclosure, a charge control method is provided. The charge control method is applied to a power supply device and includes: in response to connection with a charge device, selecting a charge protocol; when the selected charge protocol is a universal fast charge specification, determining a charge control strategy matching the universal fast charge specification, and charging the charge device based on the charge control strategy.

According to a second aspect of the examples of the disclosure, a charge control method is provided. The charge control method is applied to a charge device and includes: in response to connection with a power supply device, detecting a charge protocol; when it is detected that the charge device and the power supply device both support a universal fast charge specification, determining a charge control strategy matching the universal fast charge specification; performing charge control based on the charge control strategy.

According to a third aspect of the examples of the disclosure, a charge control apparatus is provided, including: a processor; and a memory configured to store processor-executable instructions. The processor is configured to: execute the above-mentioned charge control method.

According to a fourth aspect of the examples of the disclosure, a non-temporary computer-readable storage medium is provided. Instructions in the storage medium, when executed by a processor of a mobile terminal, cause the mobile terminal to execute the above-mentioned charge control method.

It should be understood that the above general descriptions and later detailed descriptions are merely exemplary and illustrative, and cannot limit the disclosure.

BRIEF DESCRIPTION OF THE FIGURES

The accompanying drawings herein are incorporated into the specification and constitute a part of the specification, show examples consistent with the disclosure, and together with the specification are used to explain the principle of the disclosure.

DETAILED DESCRIPTION

Examples will be described in detail here, and instances thereof are shown in the accompanying drawings. When the following description refers to the accompanying drawings, unless otherwise indicated, the same numbers in different drawings indicate the same or similar elements. The examples described in the following examples do not represent all examples consistent with the disclosure. Rather, they are merely instances of apparatuses and methods consistent with some aspects of the disclosure.

In the related technologies, fast charge protocols for fast charge of mobile terminals are private protocols of different manufacturers. Since different manufacturers have customized fast charge protocols and the fast charge technical protocols do not have universality, among chargers, charge cables and terminals of different manufacturers, a single charger or power bank cannot be compatible with fast charge of other terminals, or only mutual charging with quite low power can be performed, resulting in failure of fast charge by mutual matched use. Therefore, the charge efficiency of mobile phones is low. It is great resource waste for chargers and charge cables in the terminal market.

The operating principle of a power delivery (PD) protocol is to use a CC line of a Type-C interface as a data line to negotiate voltage, current, and power supply directions. The entire communication process needs to follow a specific data packet format, and there is a mutual authentication process. An operating mode is half-duplex, and a collision avoidance method is adopted at a physical layer to reduce communication errors on a channel, so a communication method and the communication data packet format are complicated. In addition, the use of the CC line for communication requires the use of a CtoC line or an AtoC line, which is costly and uses a complicated communication method.

The disclosure provides a charge control method. A power supply device and a charge device are connected, when a selected charge protocol is a universal fast charge specification (UFCS), charge control is performed based on a charge control strategy matching the universal fast charge specification, realizing interworking of the charge protocol between different power supply devices and charge devices so as to realize fast charge.

The charge control method provided by an example of the disclosure is applied to the power supply device and/or the charge device. The charge device may be a mobile phone, a tablet, a personal business assistant, a notebook computer, etc. The power supply device may be a charger, or a charge device capable of performing reverse charging.

Figure 1:
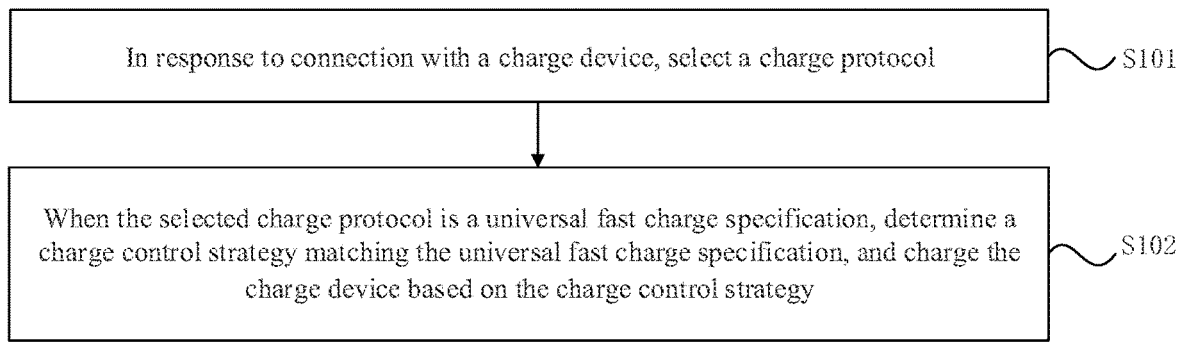
FIG. 1 is a flow diagram of a charge control method illustrated according to an example of the disclosure.

FIG. 1 is a flow diagram of a charge control method illustrated according to an example of the disclosure. As shown in FIG. 1, the charge control method is applied to a power supply device and includes the following steps.

In step S101, in response to connection with a charge device, a charge protocol is selected.

In step S102, when the selected charge protocol is a universal fast charge specification, a charge control strategy matching the universal fast charge specification is determined, and the charge device is charged based on the charge control strategy.

In the example of the disclosure, after communication connection between the charge device and the power supply device is established, the charge protocol needing to be adopted during charging is selected. The charge protocol may include a BC1.2 protocol. By selecting the charge protocol for detection, whether a charge protocol supported by the power supply device and a charge protocol supported by the charge device are the same or whether the power supply device and the charge device have the same charge protocol may be determined. If the two support the same charge protocol or have the same charge protocol, it represents that the power supply device may charge the charge device, so that whether the charge protocol supported by the two is available for fast charge may be further detected. That is, whether to adopt the charge protocol capable of performing fast charge or a common charge protocol to charge is determined. If the power supply device and the charge device do not have the same charge protocol, it represents that the power supply device cannot charge the charge device.

If the charge protocol selected by the power supply device is the UFCS, the charge control strategy matching the UFCS is determined, and the power supply device charges the charge device based on the charge control strategy matching the UFCS.

According to the example of the disclosure, the power supply device and the charge device are connected, and when the selected charge protocol is the UFCS, the charge device is charged based on the charge control strategy matching the UFCS, realizing universal fast charge between the power supply device and the charge device and improving the universal adaptability between the power supply device and the charge device.

In an example, if the power supply device obtains a universal fast charge specification packet internet groper (ping) data packet sent by the charge device and sends a correct acknowledgement data packet based on the universal fast charge specification packet internet groper data packet, it is determined that the charge device and the power supply device successfully shake hands based on the universal fast charge specification, it is determined that a differential data cable tag is set as a universal fast charge physical property tag, and the selected charge protocol is determined as the universal fast charge specification.

Figure 2:
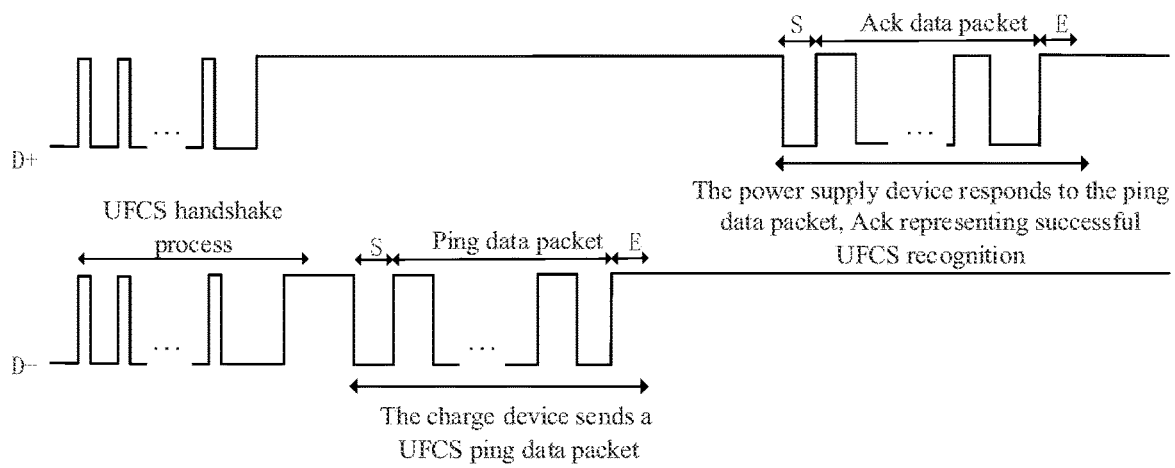
FIG. 2 is a schematic diagram of a UFCS handshake recognition process illustrated according to an example of the disclosure.

FIG. 2 is a schematic diagram of a UFCS handshake recognition process illustrated according to an example of the disclosure. As shown in FIG. 2, the power supply device receives the UFCS ping data packet sent by the charge device. It can be understood that a protocol signal of the UFCS ping data packet may be sent with a preset time interval and with a preset pulse oscillogram. In the example of the disclosure, the quantity of waveforms for determining the handshake process is not limited. In response to the UFCS ping data packet sent by the charge device, the power supply device sends a correct acknowledgement (ACK) data packet, so it is determined that the charge device and the power supply device successfully shake hands based on the UFCS, it is determined that the differential data cable tag (D+ D−) is set as a universal fast charge BC1.2 physical property tag, and the selected charge protocol is determined as the UFCS.

According to the example of the disclosure, if the power supply device obtains the UFCS ping data packet sent by the charge device and sends the ACK data packet in response to the ping data packet, it is determined that the charge device and the power supply device successfully shake hands based on the UFCS, and the selected charge protocol is determined as the UFCS, realizing fast charge for the charge device and improving the universal adaptability between the power supply device and the charge device.

Figure 3:
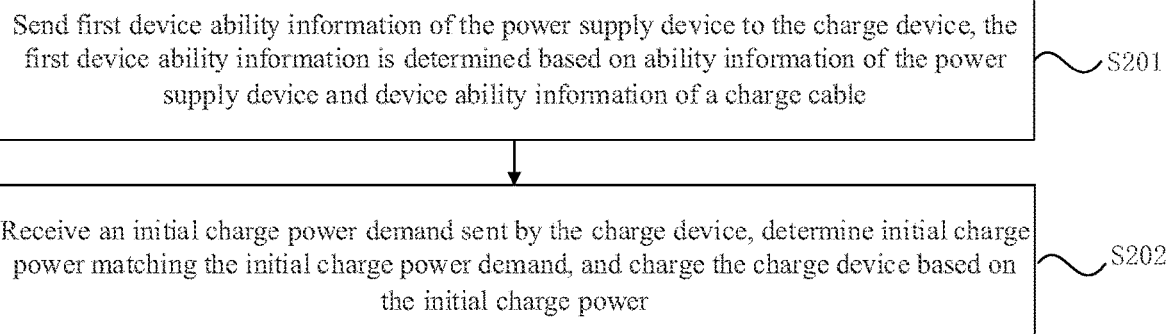
FIG. 3 is a flow diagram of a method for determining a charge control strategy matching a universal fast charge specification and charging a charge device based on the charge control strategy illustrated according to an example of the disclosure.

FIG. 3 is a flow diagram of a method for determining the charge control strategy matching the universal fast charge specification and charging the charge device based on the charge control strategy illustrated according to an example of the disclosure. As shown in FIG. 3, the method includes the following steps.

In step S201, first device ability information of the power supply device is sent to the charge device, the first device ability information is determined based on ability information of the power supply device and device ability information of a charge cable.

In step S202, an initial charge power demand sent by the charge device is received, initial charge power matching the initial charge power demand is determined, and the charge device is charged based on the initial charge power.

In the example of the disclosure, after communication connection between the charge device and the power supply device is established, the charge protocol needing to be adopted during charging is selected, if the selected charge protocol is the UFCS, the device ability information of the power supply device is sent to the charge device, the initial charge power demand sent by the charge device is received, the initial charge power matching the initial charge power demand is determined, and the charge device is charged based on the initial charge power. The initial charge power demand is determined by the charge device based on the first device ability information of the power supply device and device ability information of the charge device.

According to the example of the disclosure, the power supply device and the charge device are connected, when the selected charge protocol is the UFCS, the initial charge power demand sent by the charge device is received, the initial charge power matching the initial charge power demand is determined, and the charge device is charged based on the initial charge power, realizing universal fast charge between the power supply device and the charge device.

Figure 4:
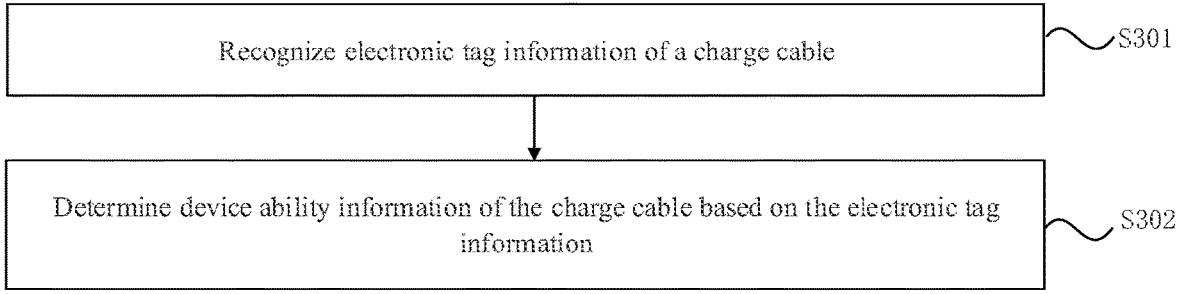
FIG. 4 is a flow diagram of a charge control method illustrated according to another example of the disclosure.

FIG. 4 is a flow diagram of a charge control method illustrated according to another example of the disclosure. As shown in FIG. 4, the method includes the following steps.

In step S301, electronic tag information of a charge cable is recognized.

In step S302, device ability information of the charge cable is determined based on the electronic tag information.

In the example of the disclosure, after communication connection between a charge device and a power supply device is established, a charge protocol needing to be adopted during charging is selected, and if the selected charge protocol is a UFCS, device ability information of the power supply device is sent to the charge device. The power supply device recognizes the electronic tag information of the charge cable, and determines the device ability information of the charge cable based on the electronic tag information. The power supply device determines first device ability information in combination with the device ability information of the charge cable, and sends the first device ability information to the charge device. An initial charge power demand sent by the charge device is received, initial charge power matching the initial charge power demand is determined, and the charge device is charged based on the initial charge power. The initial charge power demand is determined by the charge device based on the first device ability information of the power supply device and device ability information of the charge device.

According to the example of the disclosure, the power supply device and the charge device are connected, when the selected charge protocol is the UFCS, the initial charge power demand sent by the charge device is received, the initial charge power matching the initial charge power demand is determined, and the charge device is charged based on the initial charge power, realizing universal fast charge between the power supply device and the charge device.

Figure 5:
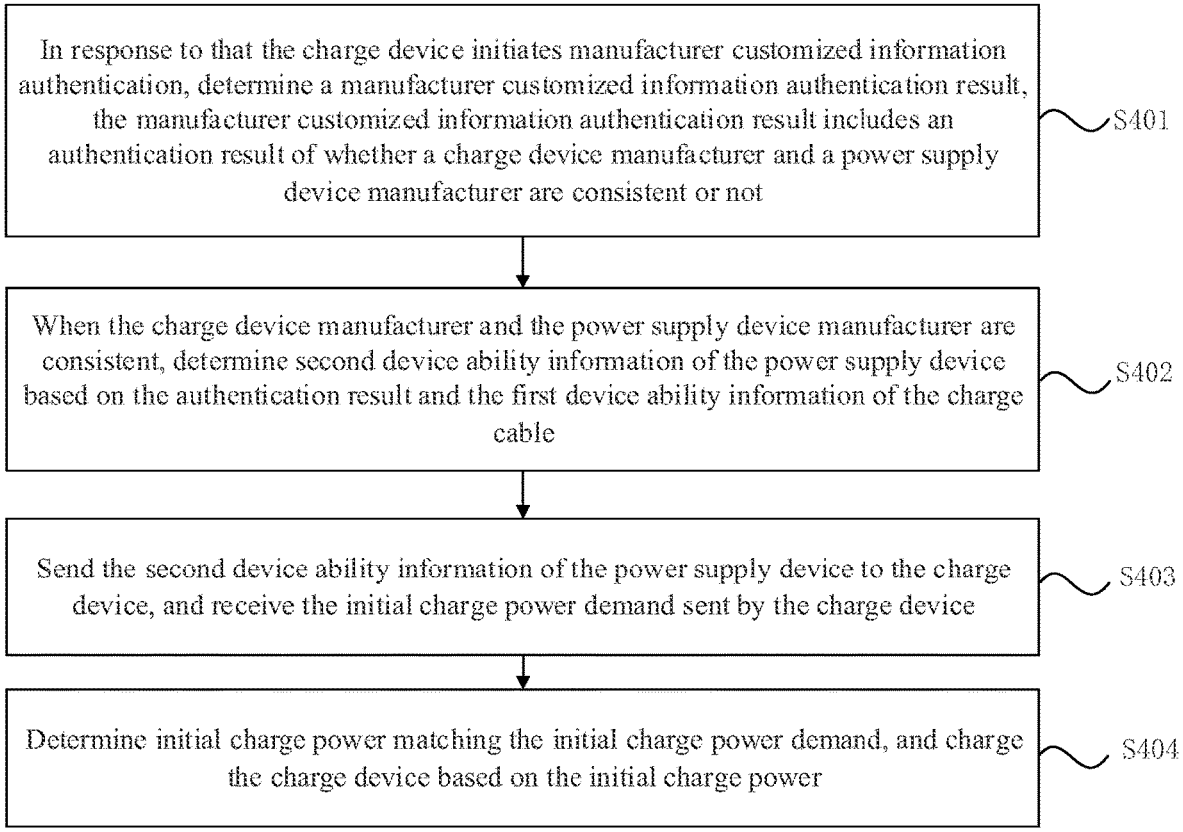
FIG. 5 is a flow diagram of a method for determining a charge control strategy matching a universal fast charge specification and charging a charge device based on the charge control strategy illustrated according to an example of the disclosure.

FIG. 5 is a flow diagram of a method for determining the charge control strategy matching the universal fast charge specification and charging the charge device based on the charge control strategy illustrated according to an example of the disclosure. As shown in FIG. 5, the charge control method includes the following steps.

In step S401, in response to that the charge device initiates manufacturer customized information authentication, a manufacturer customized information authentication result is determined. The manufacturer customized information authentication result includes an authentication result of whether a charge device manufacturer and a power supply device manufacturer are consistent or not.

In step S402, when the charge device manufacturer and the power supply device manufacturer are consistent, second device ability information of the power supply device is determined based on the authentication result and the first device ability information of the charge cable.

In step S403, the second device ability information of the power supply device is sent to the charge device, and an initial charge power demand sent by the charge device is received.

In step S404, initial charge power matching the initial charge power demand is determined, and the charge device is charged based on the initial charge power.

In the example of the disclosure, after communication connection between the charge device and the power supply device is established, the charge protocol needing to be adopted during charging is selected, and if the selected charge protocol is the UFCS, the power supply device recognizes the electronic tag information of the charge cable and determines the device ability information of the charge cable based on the electronic tag information. The power supply device determines the first device ability information in combination with the device ability information of the charge cable and sends the first device ability information to the charge device. The initial charge power demand sent by the charge device is received, the initial charge power matching the initial charge power demand is determined, and the charge device is charged based on the initial charge power. The initial charge power demand is determined by the charge device based on the first device ability information of the power supply device and the device ability information of the charge device.

In the example of the disclosure, the charge device initiates the manufacturer customized information authentication to determine the manufacturer customized information authentication result. If the charge device manufacturer and the power supply device manufacturer are consistent, the second device ability information of the power supply device is determined based on the authentication result and the first device ability information of the charge cable, the second device ability information of the power supply device is sent to the charge device, and the initial charge power demand sent by the charge device is received. The initial charge power matching the initial charge power demand is determined, and the charge device is charged based on the initial charge power. It can be understood that the initial charge power demand determined by the charge device based on the second device ability information of the power supply device is greater than the initial charge power demand determined based on the first device ability information of the power supply device. Correspondingly, the initial charge power matching the first device ability information is greater than the initial charge power matching the second device ability information.

According to the example of the disclosure, the power supply device and the charge device are connected, and when the selected charge protocol is the UFCS, if the charge device manufacturer and the power supply device manufacturer are consistent, the second device ability information of the power supply device is determined based on the authentication result and the first device ability information of the charge cable, the initial charge power matching the second device ability information is determined, and the charge device is charged based on the initial charge power.

Figure 6:
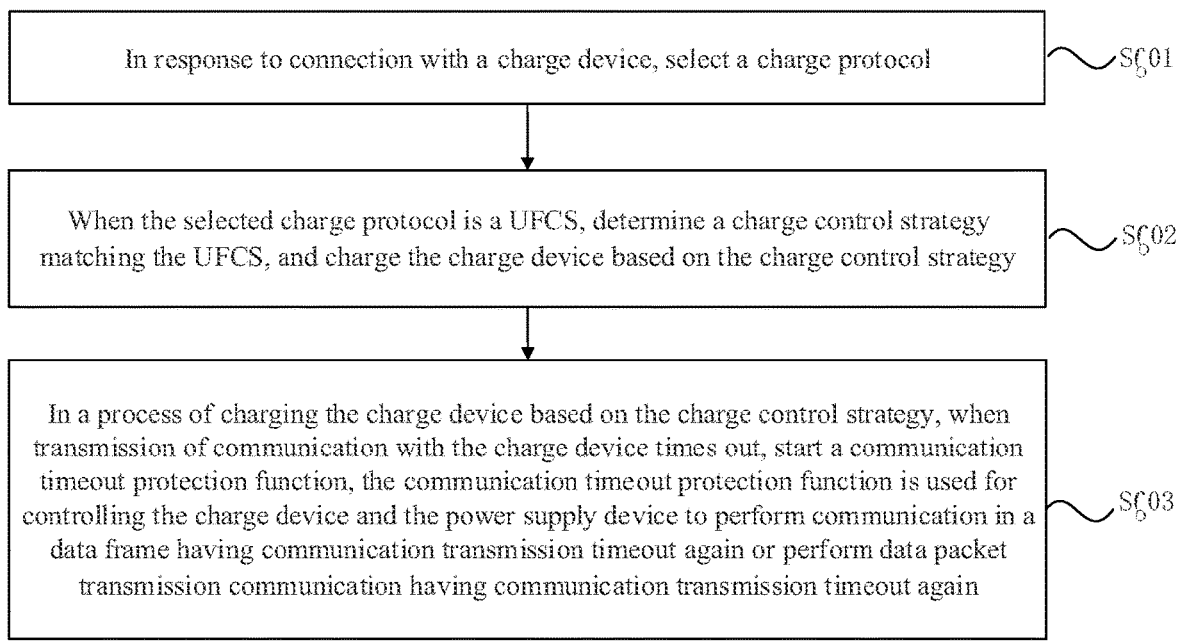
FIG. 6 is a flow diagram of a method for determining a charge control strategy matching a universal fast charge specification and charging a charge device based on the charge control strategy illustrated according to another example of the disclosure.

FIG. 6 is a flow diagram of a method for determining the charge control strategy matching the universal fast charge specification and charging the charge device based on the charge control strategy illustrated according to another example of the disclosure. As shown in FIG. 6, the charge control method includes the following steps.

In step S601, in response to connection with the charge device, the charge protocol is selected.

In step S602, when the selected charge protocol is the UFCS, the charge control strategy matching the UFCS is determined, and the charge device is charged based on the charge control strategy.

In step S603, in a process of charging the charge device based on the charge control strategy, when transmission of communication with the charge device times out, a communication timeout protection function is started, the communication timeout protection function is used for controlling the charge device and the power supply device to perform communication in a data frame having communication transmission timeout again and/or perform data packet transmission communication having communication transmission timeout again.

In the example of the disclosure, after communication connection between the charge device and the power supply device is established, the charge protocol needing to be adopted during charging is selected. If the selected charge protocol is the UFCS, the charge control strategy matching the UFCS is determined, and charge control is performed on the power supply device and the charge device based on the charge control strategy matching the UFCS.

In the example of the disclosure, the communication reliability between the power supply device and the charge device is improved through the communication timeout protection function, the selected charge protocol is the UFCS, and in a process of performing charge control based on the charge control strategy, if transmission of communication between the charge device and the power supply device times out, the communication timeout protection function is started. The power supply device and the charge device transmit a charge message based on a charge message data packet, and the charge message is used for charge control. Transmission timeout of communication between the charge device and the power supply device may include intra-data-frame timeout and data packet timeout both for data transmission. As for intra-data-frame timeout, for example, the power supply device does not receive a data frame end bit within a timeout period (tFrameReceive) in a frame which transmits data, and then a communication state machine of the power supply device needs to restore to an idle state to receive a new data frame again. As for data packet timeout, for example, after receiving a current data packet, the power supply device does not receive a next data packet of the current data packet in prior to overflow of a watchdog timer of the power supply device, and then the power supply device starts the communication timeout protection function.

In the example of the disclosure, the selected charge protocol is the UFCS, and in the process of performing charge control based on the charge control strategy matching the UFCS, if transmission of communication between the charge device and the power supply device times out, the timeout protection function is started to control the charge device and the power supply device to perform communication in the data frame having communication transmission timeout again and/or perform data packet transmission communication, improving the communication reliability and improving the universal adaptability between the power supply device and the charge device.

In the example of the disclosure, after communication connection between the charge device and the power supply device is established, the charge protocol needing to be adopted during charging is selected. If the selected charge protocol is the UFCS, the charge control strategy matching the UFCS is determined, and charge control is performed on the power supply device and the charge device based on the charge control strategy matching the UFCS. When the power supply device operates in the UFCS, the power supply device restores to an initial state if a universal fast charge specification exiting (Exit_UFCS_Mod) instruction is received or plugging-out of the charge device is detected. The differential data cable tag is set as the BC1.2 physical property tag, an output voltage of a differential data cable is set within a default voltage range, and an acknowledgement instruction of having been exited the universal fast charge specification is sent to the charge device. When, after preset time, the charge device detects that the power supply device meets the following conditions at the same time, the charge device believes that the power supply device successfully exits the UFCS, otherwise, it is believed that the power supply device fails to exit the UFCS. The conditions to be met include: the charge device detects that the power supply device meets the differential data cable tag being the BC1.2 physical property tag, the output voltage of the differential data cable is set within the default voltage range, and the acknowledgement (ACK) instruction of having been exited the UFCS is sent by the power supply device to the charge device. A preset time threshold may be set according to use requirements. If the charge device detects that the power supply device fails to exit the UFCS, the charge device shall retry detection three times, and the charge device sends hardware resetting if the charge device detects failure of exiting of the power supply device after three times of detection.

According to the example of the disclosure, after charge control is performed based on the charge control strategy, the power supply device receives the UFCS exiting instruction, or the power supply device and the charge device are disconnected, the power supply device exits the UFCS to determine to select other protocols so as to perform charging under the other charge protocols, and the universal adaptability between the power supply device and the charge device is realized.

Figure 7:
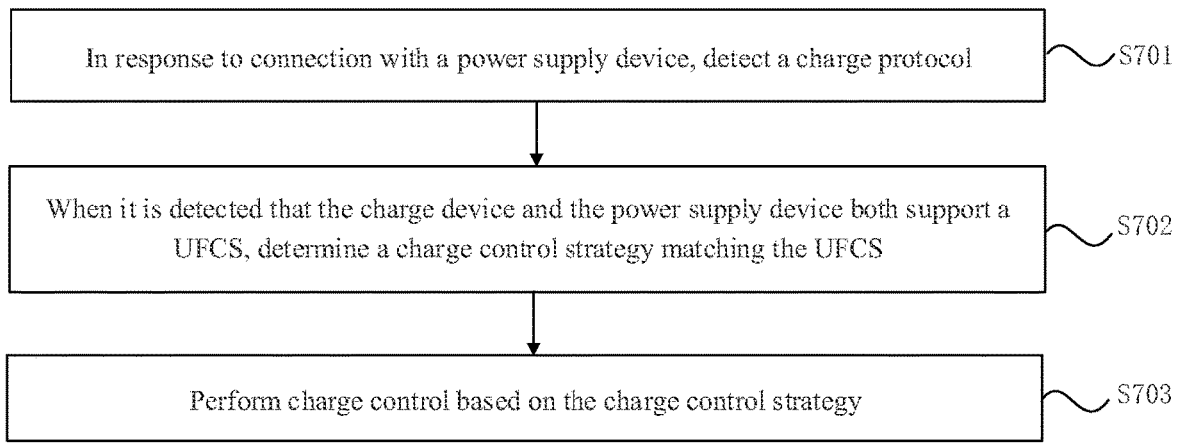
FIG. 7 is a flow diagram of a charge control method illustrated according to another example of the disclosure.

FIG. 7 is a flow diagram of a charge control method illustrated according to another example of the disclosure. The charge control method is applied to a charge device. As shown in FIG. 7, the charge control method includes the following steps.

In step S701, in response to connection with a power supply device, a charge protocol is detected.

In step S702, when it is detected that the charge device and the power supply device both support a UFCS, a charge control strategy matching the UFCS is determined.

In step S703, charge control is performed based on the charge control strategy.

In the example of the disclosure, after communication connection between the charge device and the power supply device is established, the charge device detects the charge protocol, and the charge protocol needing to be adopted during charging is selected. If the selected charge protocol is the UFCS, the charge control strategy matching the UFCS is determined, and charge control is performed based on the charge control strategy matching the UFCS.

According to the example of the disclosure, the power supply device and the charge device are connected, and when the selected charge protocol is the UFCS, the charge device is charged based on the charge control strategy matching the UFCS, realizing universal fast charge between the power supply device and the charge device and improving the universal adaptability between the power supply device and the charge device.

Figure 8:
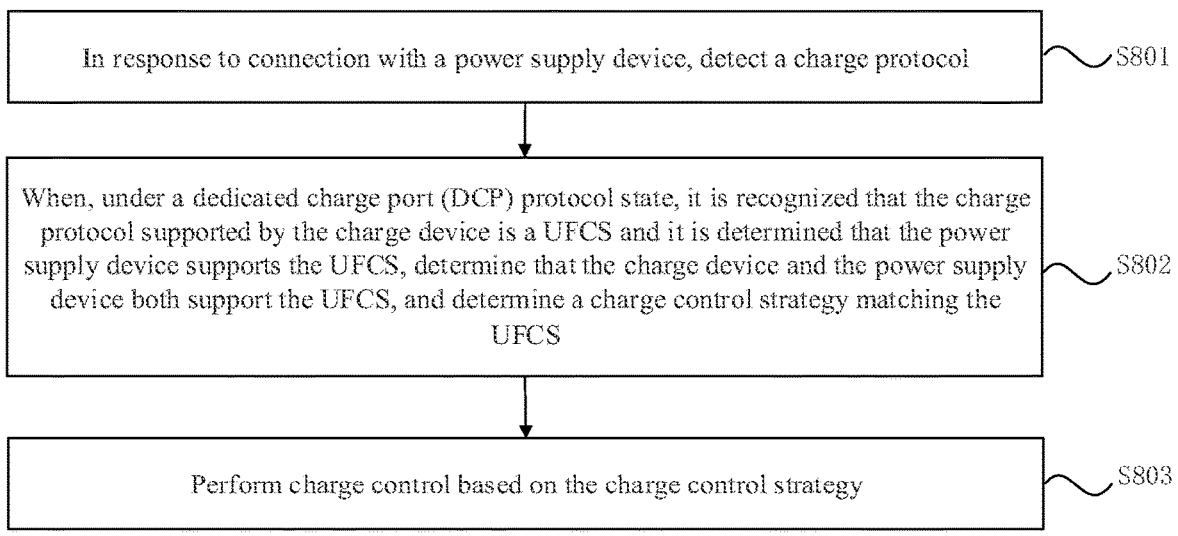
FIG. 8 is a flow diagram of a charge control method illustrated according to another example of the disclosure.

FIG. 8 is a flow diagram of a charge control method illustrated according to another example of the disclosure. The charge control method is applied to a charge device. As shown in FIG. 8, the charge control method includes the following steps.

In step S801, in response to connection with a power supply device, a charge protocol is detected.

In step S802, when, under a dedicated charge port (DCP) protocol state, it is recognized that the charge protocol supported by the charge device is a UFCS and it is determined that the power supply device supports the UFCS, it is determined that the charge device and the power supply device both support the UFCS, and a charge control strategy matching the UFCS is determined.

In step S803, charge control is performed based on the charge control strategy.

In the example of the disclosure, after communication connection between the charge device and the power supply device is established, the charge device detects the charge protocol, and if, under the DCP protocol state, it is recognized that the charge protocol supported by the charge device is the UFCS and it is determined that the power supply device supports the UFCS, it is determined that the charge device and the power supply device both support the UFCS, and the charge control strategy matching the UFCS is determined. Charge control is performed based on the charge control strategy matching the UFCS.

According to the example of the disclosure, the power supply device and the charge device are connected, and when the selected charge protocol is the UFCS, the charge device is charged based on the charge control strategy matching the UFCS, realizing universal fast charge between the power supply device and the charge device and improving the universal adaptability between the power supply device and the charge device.

Figure 9:
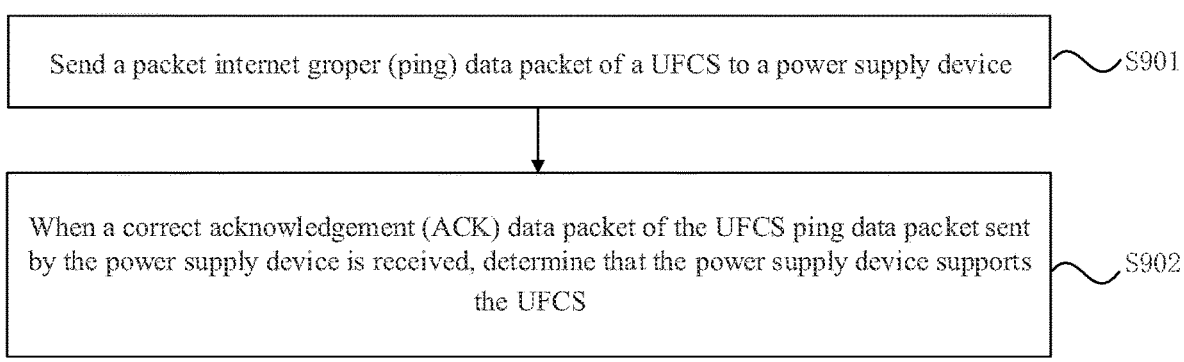
FIG. 9 is a flow diagram of a method for determining that a power supply device supports a universal fast charge specification illustrated according to an example of the disclosure.

FIG. 9 is a flow diagram of a method for determining that the power supply device supports the universal fast charge specification illustrated according to an example of the disclosure. As shown in FIG. 9, the method includes the following steps.

In step S901, the packet internet groper (ping) data packet of the UFCS is sent to the power supply device.

In step S902, when the correct acknowledgement (ACK) data packet of the UFCS ping data packet sent by the power supply device is received, it is determined that the power supply device supports the UFCS.

In the example of the disclosure, the charge device sends the UFCS ping data packet to the power supply device, and if the charge device receives the correct ACK data packet sent by the power supply device in response to the UFCS ping data packet, it is determined that the power supply device supports the UFCS.

According to the example of the disclosure, if the power supply device obtains the UFCS ping data packet sent by the charge device and sends the ACK data packet in response to the ping data packet, it is determined that the power supply device supports the UFCS, realizing fast charge for the charge device and improving the universal adaptability between the power supply device and the charge device.

Figure 10:
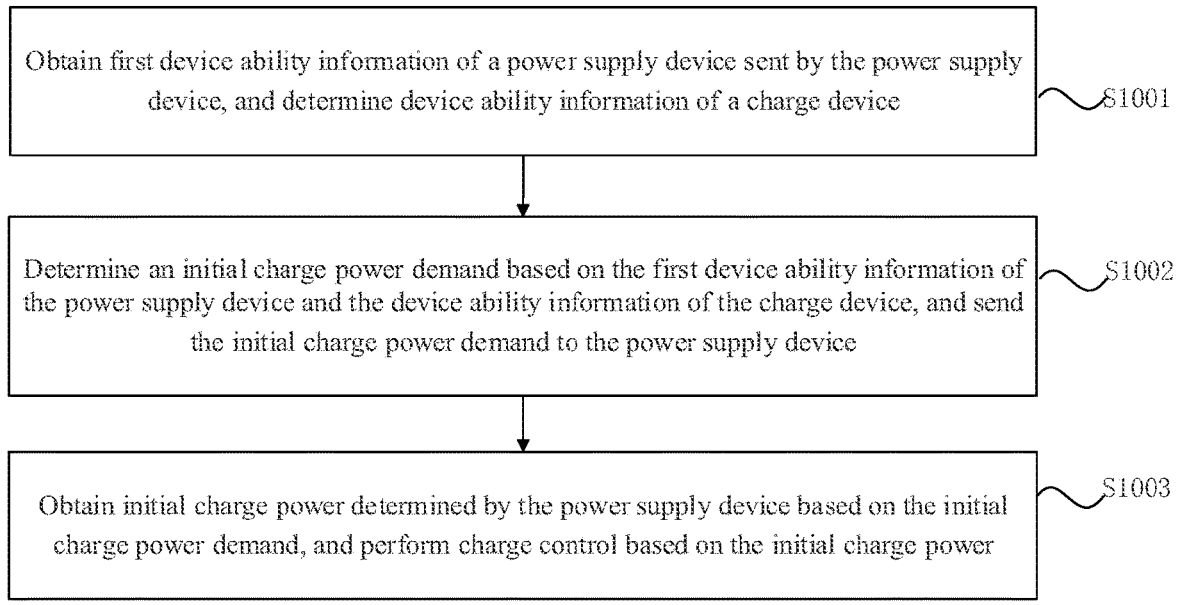
FIG. 10 is a flow diagram of a method for performing charge control based on a charge control strategy illustrated according to an example of the disclosure.

FIG. 10 is a flow diagram of a method for performing charge control based on the charge control strategy illustrated according to an example of the disclosure. As shown in FIG. 10, the method includes the following steps.

In step S1001, the first device ability information of the power supply device sent by the power supply device is obtained, and the device ability information of the charge device is determined.

In step S1002, the initial charge power demand is determined based on the first device ability information of the power supply device and the device ability information of the charge device, and the initial charge power demand is sent to the power supply device.

In step S1003, the initial charge power determined by the power supply device based on the initial charge power demand is obtained, and charge control is performed based on the initial charge power.

In the example of the disclosure, after communication connection between the charge device and the power supply device is established, the charge device detects the charge protocol, and the charge protocol needing to be adopted during charging is selected. If the selected charge protocol is the UFCS, the charge device obtains the first device ability information of the power supply device sent by the power supply device and the device ability information of the charge device. The charge device determines the initial charge power demand based on the first device ability information of the power supply device and the device ability information of the charge device, and sends the initial charge power demand to the power supply device. The charge device obtains the initial charge power determined by the power supply device based on the initial charge power demand, and performs charge control based on the initial charge power.

According to the example of the disclosure, the power supply device and the charge device are connected, and when the selected charge protocol is the UFCS, the charge device obtains the initial charge power determined by the power supply device based on the initial charge power demand, and performs charge control based on the initial charge power, realizing universal fast charge between the power supply device and the charge device.

Figure 11:
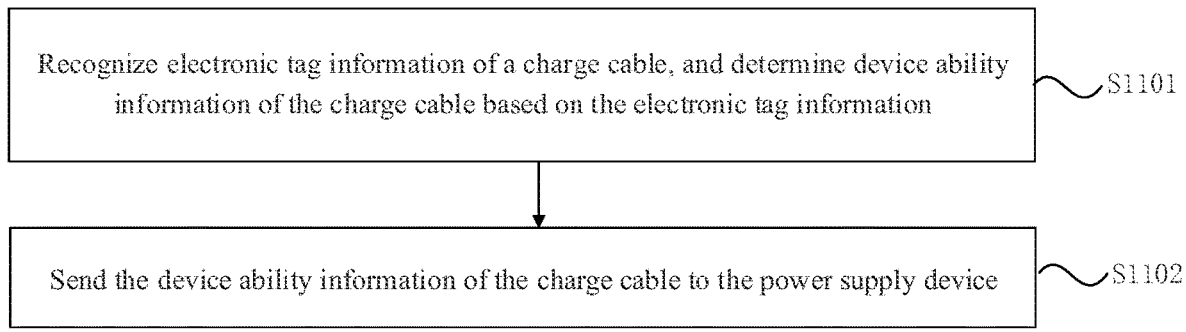
FIG. 11 is a flow diagram of a method for determining device ability information of a charge cable illustrated according to an example of the disclosure.

FIG. 11 is a flow diagram of a method for determining the device ability information of the charge cable illustrated according to an example of the disclosure. As shown in FIG. 11, the method includes the following steps.

In step S1101, the electronic tag information of the charge cable is recognized, and the device ability information of the charge cable is determined based on the electronic tag information.

In step S1102, the device ability information of the charge cable is sent to the power supply device.

In the example of the disclosure, if the charge device and the charge cable successfully communicate with each other, it is determined to recognize the electronic tag information of the charge cable by the charge device, that is, the charge device determines the device ability information of the charge cable based on the electronic tag information. The device ability information of the charge cable is sent to the power supply device, so that the power supply device determines the first device ability information and the second device ability information of the power supply device based on the device ability information of the charge cable.

According to the example of the disclosure, the power supply device and the charge device are connected, and when the selected charge protocol is the UFCS, the charge device obtains the initial charge power determined by the power supply device based on the initial charge power demand, and performs charge control based on the initial charge power, realizing universal fast charge between the power supply device and the charge device.

Figure 12:
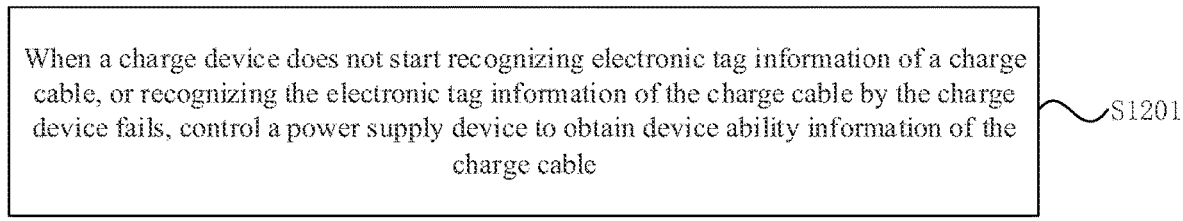
FIG. 12 is a flow diagram of a method for determining device ability information of a charge cable illustrated according to another example of the disclosure.

FIG. 12 is a flow diagram of a method for determining the device ability information of the charge cable illustrated according to another example of the disclosure. As shown in FIG. 12, the method includes the following steps.

In step S1201, when the charge device does not start recognizing the electronic tag information of the charge cable, or recognizing the electronic tag information of the charge cable by the charge device fails, the power supply device is controlled to obtain the device ability information of the charge cable.

In the example of the disclosure, if the charge device does not start recognizing the electronic tag information of the charge cable, or recognizing the electronic tag information of the charge cable by the charge device fails, whether the power supply device starts recognizing the electronic tag information of the charge cable or not is determined. If the power supply device starts recognizing the electronic tag information of the charge cable, whether the power supply device successfully recognizes the electronic tag information of the charge cable or not is further determined. If the power supply device does not start recognizing the electronic tag information of the charge cable, or the power supply device fails to recognize the electronic tag information of the charge cable, it is determined that the cable has no electronic information tag.

According to the example of the disclosure, the power supply device and the charge device are connected, and when the selected charge protocol is the UFCS, the charge device obtains the initial charge power determined by the power supply device based on the initial charge power demand, and performs charge control based on the initial charge power, realizing universal fast charge between the power supply device and the charge device.

Figure 13:
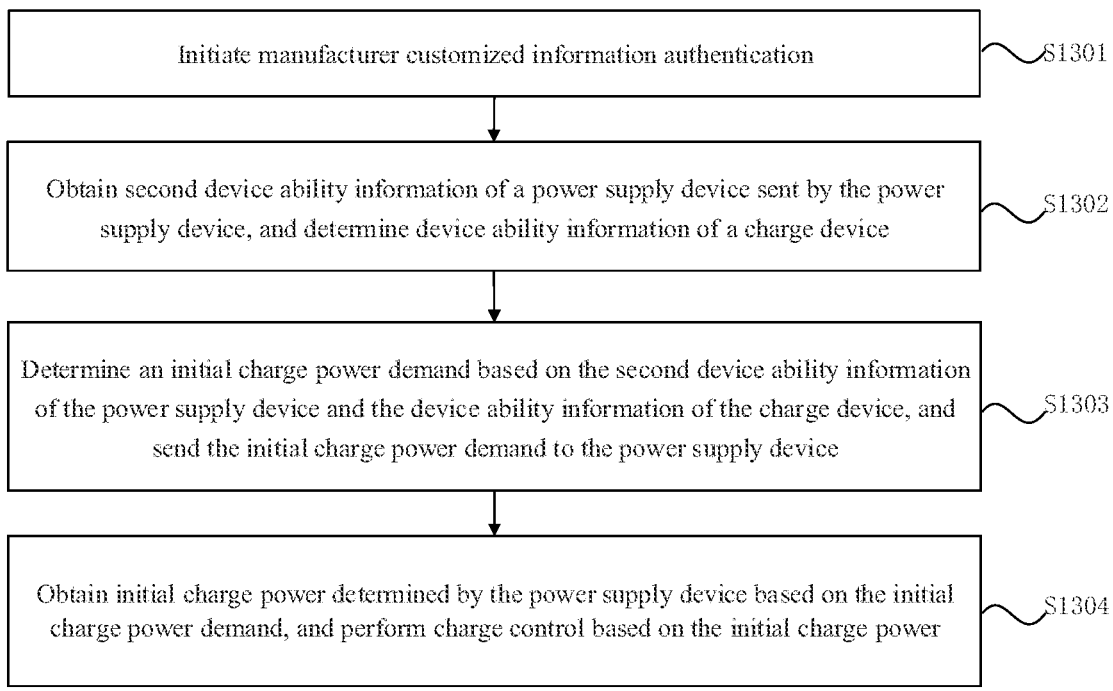
FIG. 13 is a flow diagram of a method for performing charge control based on a charge control strategy illustrated according to an example of the disclosure.

FIG. 13 is a flow diagram of a method for performing charge control based on the charge control strategy illustrated according to an example of the disclosure. As shown in FIG. 13, the method includes the following steps.

In step S1301, manufacturer customized information authentication is initiated.

In step S1302, the second device ability information of the power supply device sent by the power supply device is obtained, and the device ability information of the charge device is determined.

In step S1303, the initial charge power demand is determined based on the second device ability information of the power supply device and the device ability information of the charge device, and the initial charge power demand is sent to the power supply device.

In step S1304, the initial charge power determined by the power supply device based on the initial charge power demand is obtained, and charge control is performed based on the initial charge power.

In the example of the disclosure, after communication connection between the charge device and the power supply device is established, the charge device detects the charge protocol, and the charge protocol needing to be adopted during charging is selected. If the selected charge protocol is the UFCS, the charge device initiates manufacturer customized information authentication with the power supply device.

In the example of the disclosure, the manufacturer customized information authentication result includes the authentication result of whether the charge device manufacturer and the power supply device manufacturer are consistent or not. If the charge device manufacturer and the power supply device manufacturer are consistent, the power supply device determines the second device ability information based on the authentication result and the first device ability information of the charge cable, and sends the second device ability information of the power supply device to the charge device. The charge device determines the initial charge power demand based on the second device ability information of the power supply device and the device ability information of the charge device, and sends the initial charge power demand to the power supply device. The initial charge power demand determined by the charge device based on the second device ability information of the power supply device is greater than the initial charge power determined by the charge device based on the first device ability information of the power supply device. The charge device obtains the initial charge power determined by the power supply device based on the initial charge power demand, and performs charge control based on the initial charge power.

According to the example of the disclosure, the power supply device and the charge device are connected, and when the selected charge protocol is the UFCS, if the charge device manufacturer and the power supply device manufacturer are consistent, the initial charge power matching the second device ability information is determined, and charge control is performed on the charge device based on the initial charge power, improving the fast charge efficiency.

Figure 14:
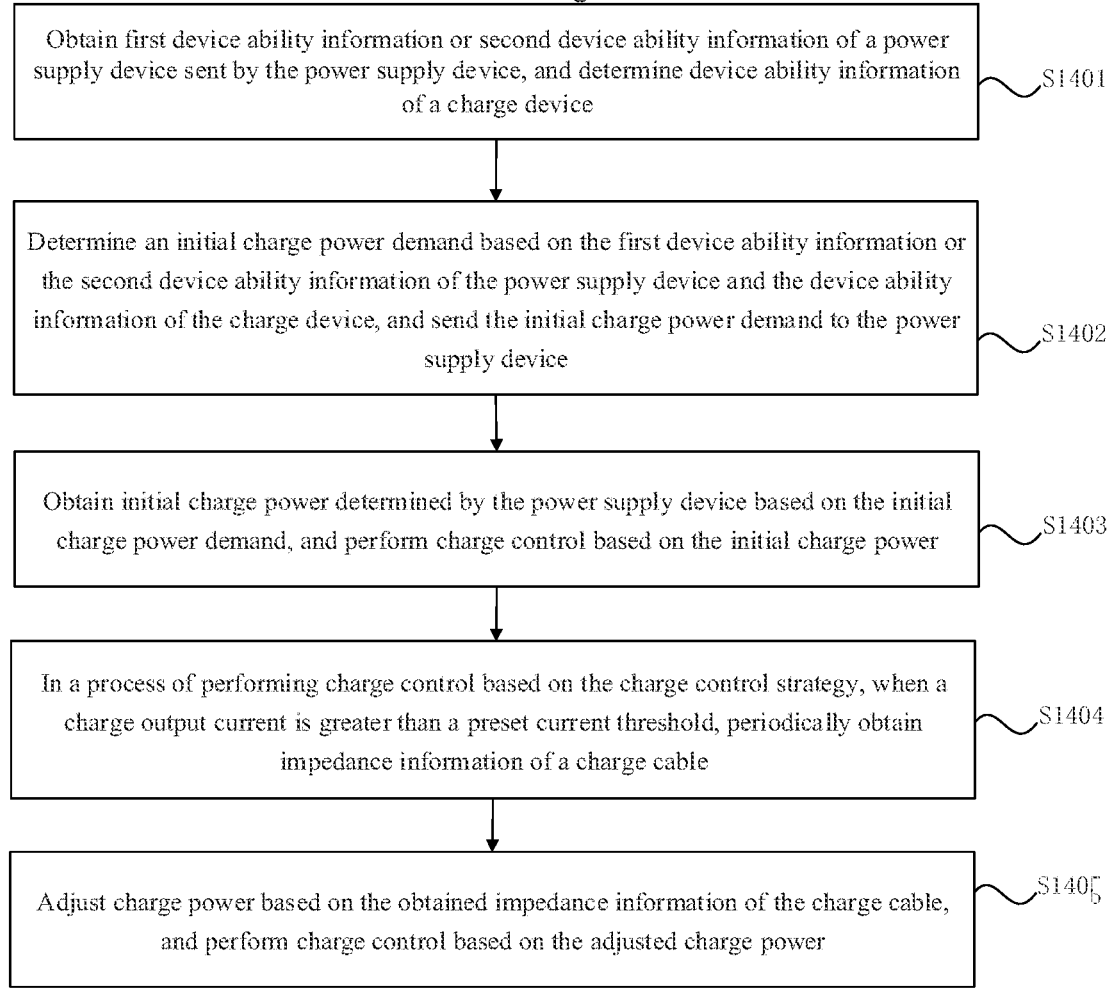
FIG. 14 is a flow diagram of a charge control method illustrated according to another example of the disclosure.

FIG. 14 is a flow diagram of a charge control method illustrated according to another example of the disclosure. As shown in FIG. 14, the charge control method includes the following steps.

In step S1401, first device ability information or second device ability information of a power supply device sent by the power supply device is obtained, and device ability information of a charge device is determined.

In step S1402, an initial charge power demand is determined based on the first device ability information or the second device ability information of the power supply device and the device ability information of the charge device, and the initial charge power demand is sent to the power supply device.

In step S1403, initial charge power determined by the power supply device based on the initial charge power demand is obtained, and charge control is performed based on the initial charge power.

In step S1404, in a process of performing charge control based on a charge control strategy, when a charge output current is greater than a preset current threshold, impedance information of a charge cable is periodically obtained.

In step S1405, charge power is adjusted based on the obtained impedance information of the charge cable, and charge control is performed based on the adjusted charge power.

In the example of the disclosure, after communication connection between the charge device and the power supply device is established, the charge device detects a charge protocol, and the charge protocol needing to be adopted during charging is selected. If the selected charge protocol is a UFCS, the charge device obtains the initial charge power determined by the power supply device based on the initial charge power demand, and performs charge control based on the initial charge power. When the charge device determines the initial power demand, it may be determined based on the first device ability information of the power supply device and the device ability information of the charge device, and it may also be determined based on the second device ability information determined by the power supply device based on a manufacturer customized information authentication result and the device ability information of the charge device. It can be understood that the step of the charge device determining the initial charge power demand is the same as the steps in FIG. 10 and FIG. 13 above, which is omitted here. The charge device operates in the state of the selected UFCS to recognize charge cable information so as to ensure safe use of the cable, and ensure safe and effective charging.

In the example of the disclosure, as the usage time increases, the charge cable is aged or damaged, making impedance of the charge cable increased, while the increased impedance of the charge cable increases loads of the charge cable, and consequently the power loss is increased. In order to ensure safety of the charge cable, reduce the impact of external factors and prevent burning of the charge cable caused by a large-current charge scenario, cable aging and the like, the charge device and the power supply device have a cable information obtaining function. For example, in the fast charge process of the charge device, if the charge output current is greater than the preset current threshold, the charge device is controlled to periodically obtain the impedance information of the charge cable without determining manufacturer information. For example, the preset current threshold may be 3 A. When an output current of a charger is greater than 3 A, path impedance is periodically detected. It can be understood that an impedance detecting period must not exceed a preset detecting period threshold to further ensure safety in use. The charge power is adjusted based on the obtained impedance information of the charge cable, and charge control is performed based on the adjusted charge power.

According to the example of the disclosure, the selected charge protocol is the UFCS, and in the process of performing charge control based on the charge control strategy, if the charge output current is greater than the preset current threshold, the charge device is controlled to periodically obtain the impedance information of the charge cable, adjust the charge power based on the obtained impedance information of the charge cable, and perform charge control based on the adjusted charge power to ensure safety in use of the charge cable, and improve the universal adaptability between the power supply device and the charge device.

Figure 15:
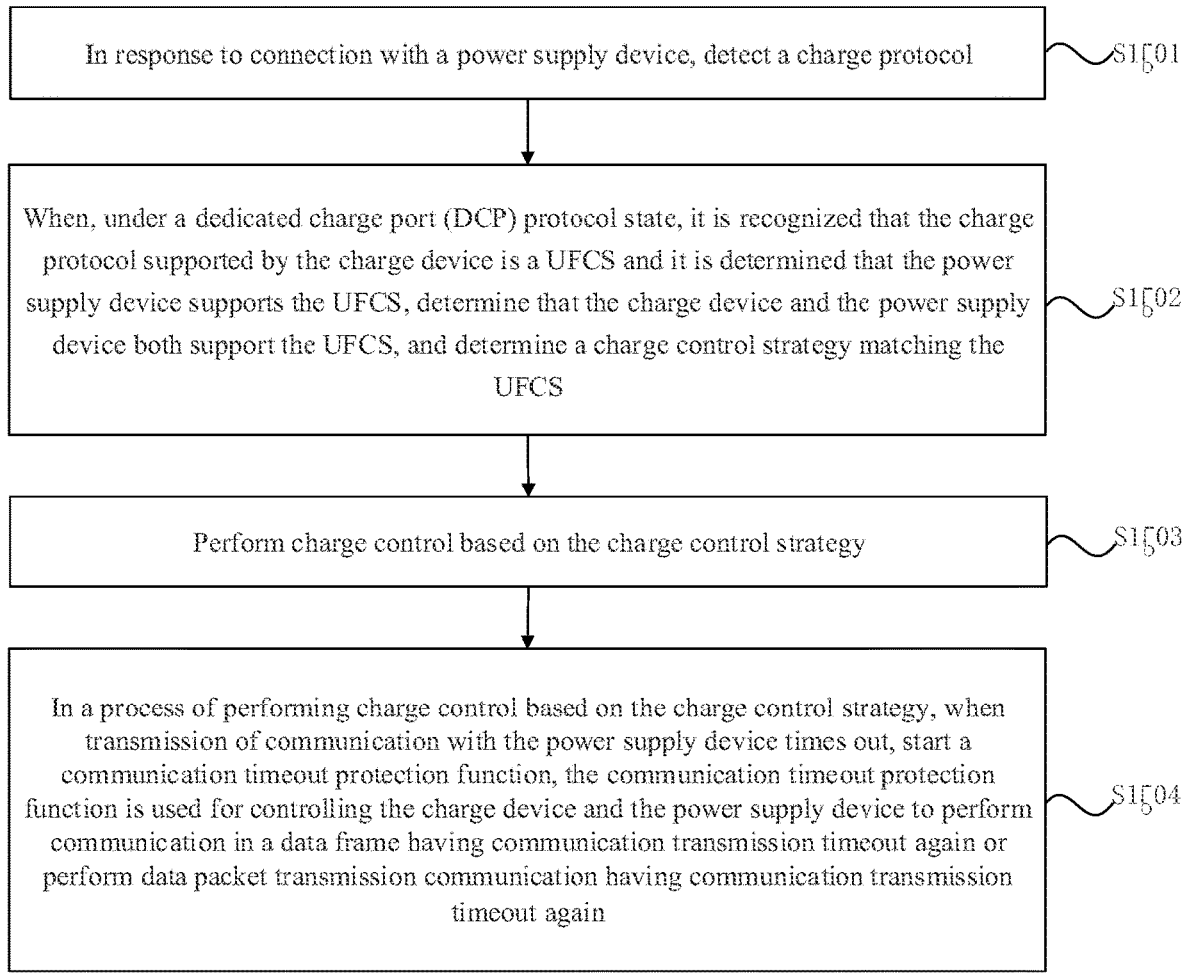
FIG. 15 is a flow diagram of a charge control method illustrated according to an example of the disclosure.

FIG. 15 is a flow diagram of a charge control method illustrated according to an example of the disclosure. The charge control method is applied to a charge device. As shown in FIG. 15, the charge control method includes the following steps.

In step S1501, in response to connection with a power supply device, a charge protocol is detected.

In step S1502, when, under a dedicated charge port (DCP) protocol state, it is recognized that the charge protocol supported by the charge device is a UFCS and it is determined that the power supply device supports the UFCS, it is determined that the charge device and the power supply device both support the UFCS, and a charge control strategy matching the UFCS is determined.

In step S1503, charge control is performed based on the charge control strategy.

In step S1504, in a process of performing charge control based on the charge control strategy, when transmission of communication with the power supply device times out, a communication timeout protection function is started, the communication timeout protection function is used for controlling the charge device and the power supply device to perform communication in a data frame having communication transmission timeout again and/or perform data packet transmission communication having communication transmission timeout again.

In the example of the disclosure, after communication connection between the charge device and the power supply device is established, the charge device detects the charge protocol, and the charge protocol needing to be adopted during charging is selected. If, under the DCP protocol state, it is recognized that the charge protocol supported by the charge device is the UFCS and it is determined that the power supply device supports the UFCS, it is determined that the charge device and the power supply device both support the UFCS, and the charge control strategy matching the UFCS is determined. In the example of the disclosure, the communication reliability between the power supply device and the charge device is improved through the communication timeout protection function, the charge device selects the charge protocol as the UFCS, and in the process of performing charge control based on the charge control strategy, if transmission of communication between the charge device and the power supply device times out, the communication timeout protection function is started. The power supply device and the charge device transmit a charge message based on a charge message data packet, and the charge message is used for charge control. Transmission timeout of communication between the charge device and the power supply device may include intra-data-frame timeout and data packet timeout both for data transmission. As for intra-data-frame timeout, for example, the charge device does not receive a data frame end bit within a timeout period (tFrameReceive) in a frame which transmits data, and then a communication state machine of the charge device needs to restore to an idle state to receive a new data frame again. As for data packet timeout, for example, after receiving a current data packet, the charge device does not receive a next data packet of the current data packet in prior to overflow of a watchdog timer of the charge device, and then the charge device starts the communication timeout protection function.

According to the example of the disclosure, the selected charge protocol is the UFCS, and in the process of performing charge control based on the charge control strategy matching the UFCS, if transmission of communication between the charge device and the power supply device times out, the timeout protection function is started to control the charge device and the power supply device to perform communication in the data frame having communication transmission timeout again and/or perform data packet transmission communication, thereby improving the communication reliability and improving the universal adaptability between the power supply device and the charge device.

The example of the disclosure describes the charge control method involved above in the following in combination with practical applications.

Figure 16:
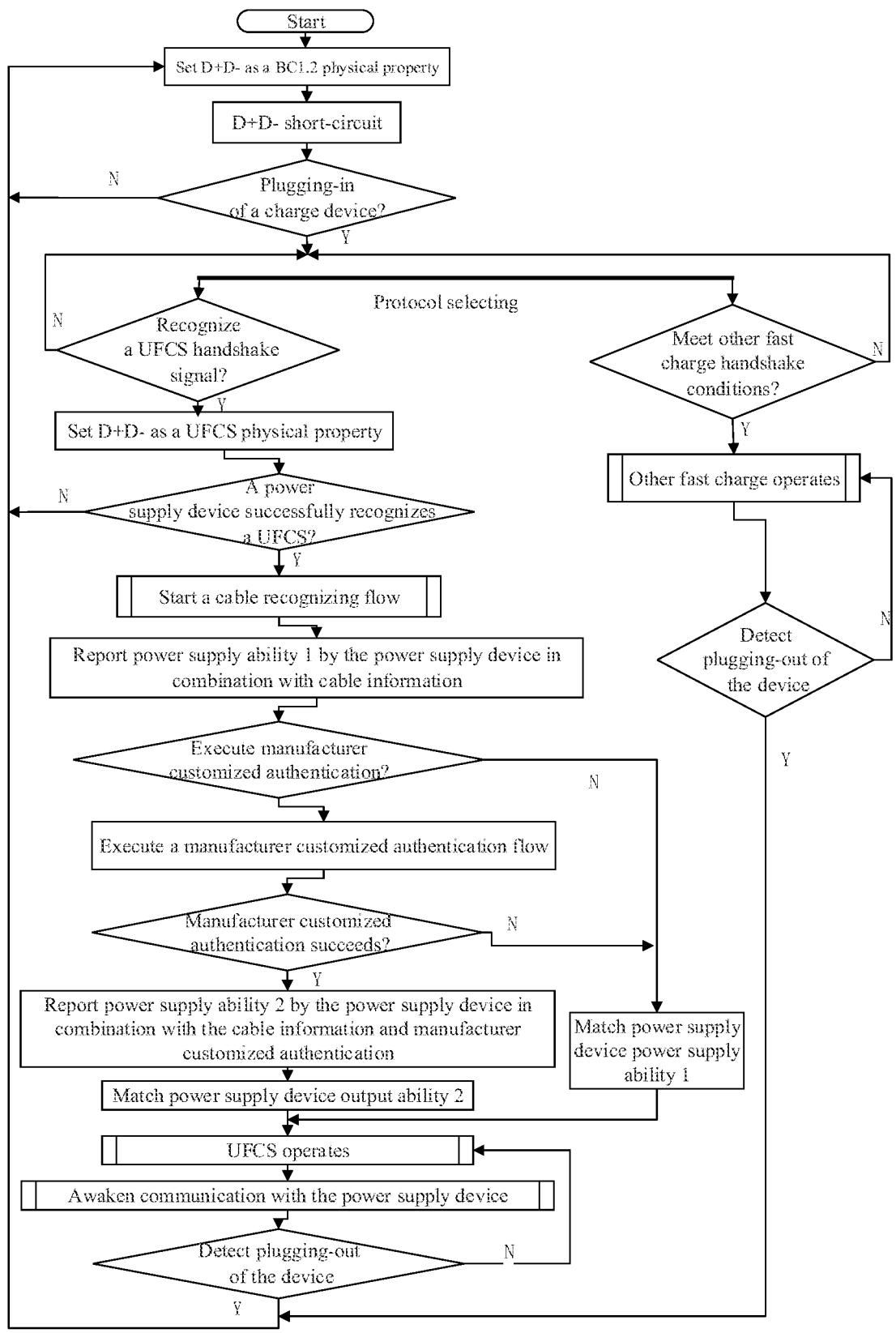
FIG. 16 is a flow diagram of a charge control method illustrated according to another example of the disclosure.

FIG. 16 is a flow diagram of a charge control method illustrated according to another example of the disclosure. As shown in FIG. 16, the charge control method is applied to a power supply device. D+ and D− of the power supply device are set to meet a BC1.2 protocol. The BC1.2 protocol is a charge specification of a USB interface. Through short-circuit of D+ and D−, it is determined that the power supply device enters into the BC1.2 charge protocol. In response to plugging-in of a charge device, communication connection between the charge device and the power supply device is established. In a process of detecting a charge protocol, at a protocol handshake stage, a UFCS and other fast charge protocols may execute a handshake operation simultaneously, and a condition of successful UFCS recognition is that the power supply device responds to a UFCS ping data packet sent by the charge device. If the charge protocol meets other fast charge handshake conditions, other fast charge protocols are selected to work. If none of the UFCS and the other fast charge protocols is successfully recognized, it goes back to an initial state to wait for communication with the power supply device again. When the successfully selected charge protocol is the UFCS, or the power supply device successfully selects the other protocols, the power supply device operates in a state of the selected protocol.

After the UFCS is selected, the power supply device starts a cable recognizing flow and reports power supply device ability information 1 in combination with cable information. Whether the power supply device executes judging whether manufacturer information of the power supply device and manufacturer information of the charge device meet a condition of improving charge power is determined, and the power supply device reports power supply device ability information 2 in combination with the cable information and the manufacturer information. If it is determined that judging whether the manufacturer information of the power supply device and the manufacturer information of the charge device meet the condition of improving the charge power is not executed, charge power matching the power supply device ability information 1 is determined for performing charge control. If the manufacturer information of the power supply device and the manufacturer information of the charge device meet the condition of improving the charge power, a charge power threshold matching the power supply device ability information 2 for charging is determined. The charge power threshold is greater than initial charge power, and charge control is performed with charge power which is greater than the initial charge power and smaller than the charge power threshold. If the manufacturer information of the power supply device and the manufacturer information of the charge device do not meet the condition of improving the charge power, charge power matching the power supply device ability information 1 for charging is determined for performing charge control. In a process of performing charge control based on a charge control strategy, if transmission of communication between the charge device and the power supply device times out, a timeout protection function is started to control the charge device and the power supply device to perform communication in a data frame having communication transmission timeout again and/or perform data packet transmission communication, improving the communication reliability and improving the universal adaptability between the power supply device and the charge device. If the power supply device receives a UFCS exiting instruction or detects plugging-out of the charge device, the power supply device restores to an initial state, and the charge process is interrupted.

Figure 17:
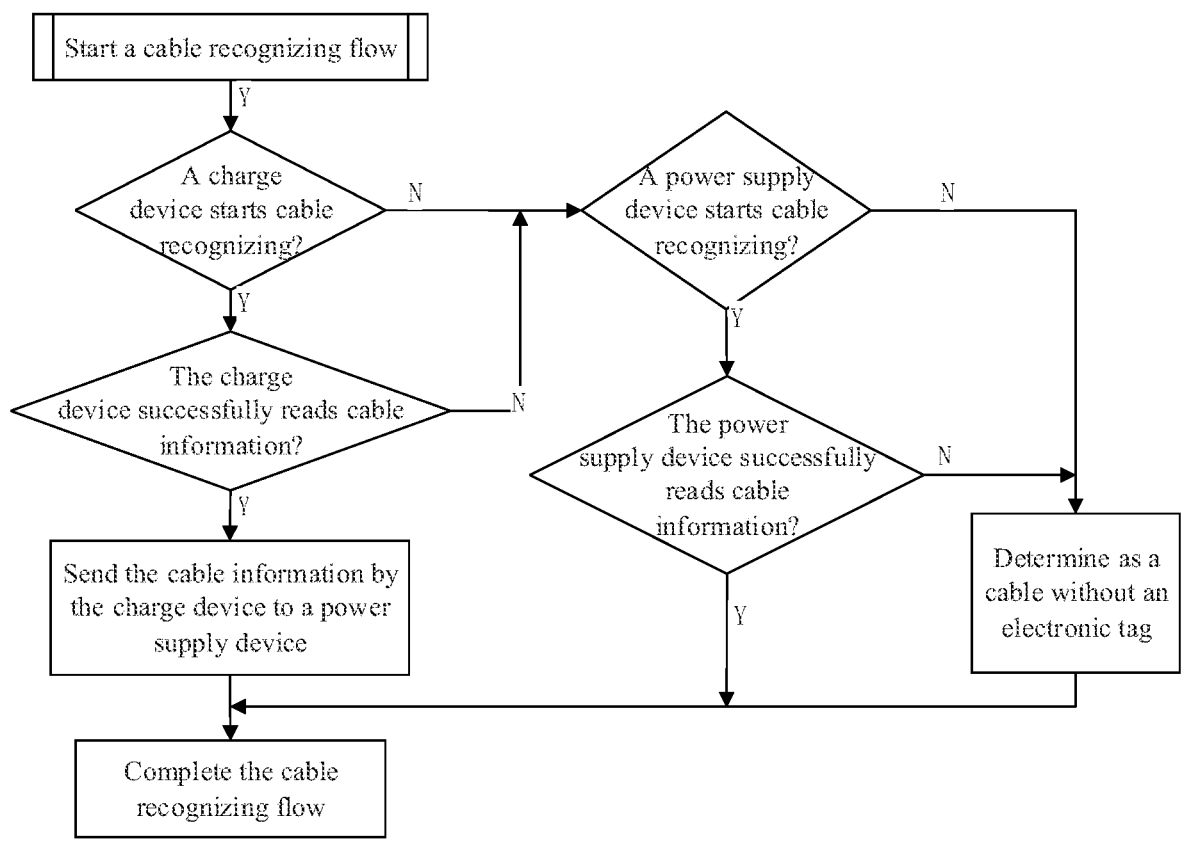
FIG. 17 is a flow diagram of obtaining information of a charge cable by a charge device illustrated according to an example of the disclosure.

FIG. 17 is a flow diagram of obtaining information of a charge cable by the charge device illustrated according to an example of the disclosure. As shown in FIG. 17, in the process of charging based on the UFCS, after the charge device successfully recognizes the UFCS, the charge device can read electronic tag information of the cable, to reduce cable information obtaining flows and guarantee the safety of the information. If the charge device fails to read, the power supply device is switched to read the electronic tag information of the cable. The charge cable recognizing flow is started, and if the charge device starts cable recognition communication and the charge device successfully reads the electronic tag information of the cable, the charge device sends the electronic tag information of the cable to the power supply device, so that the cable recognizing flow is completed. A maximum charge power threshold which is supported by the charge device and the power supply device and greater than the initial charge power is determined, and the charge device is charged with charge power which is greater than the initial charge power and smaller than the maximum charge power threshold.

If the charge device does not start cable recognition communication, it is determined that the power supply device reads the electronic tag information of the cable, whether the power supply device starts cable recognition communication is judged, and if the power supply device starts cable recognition communication and the power supply device successfully reads the electronic tag information of the cable, the cable recognizing flow is completed. If the power supply device does not start cable recognition communication, or the power supply device starts cable recognition communication but fails to read the electronic tag information of the cable, it is determined that there is no cable electronic information tag, and the cable recognizing flow is completed. The initial charge power is determined based on the device ability information of the power supply device, the device ability information of the charge cable and the device ability information of the charge device, and charge control is performed based on the initial charge power.

Figure 18:
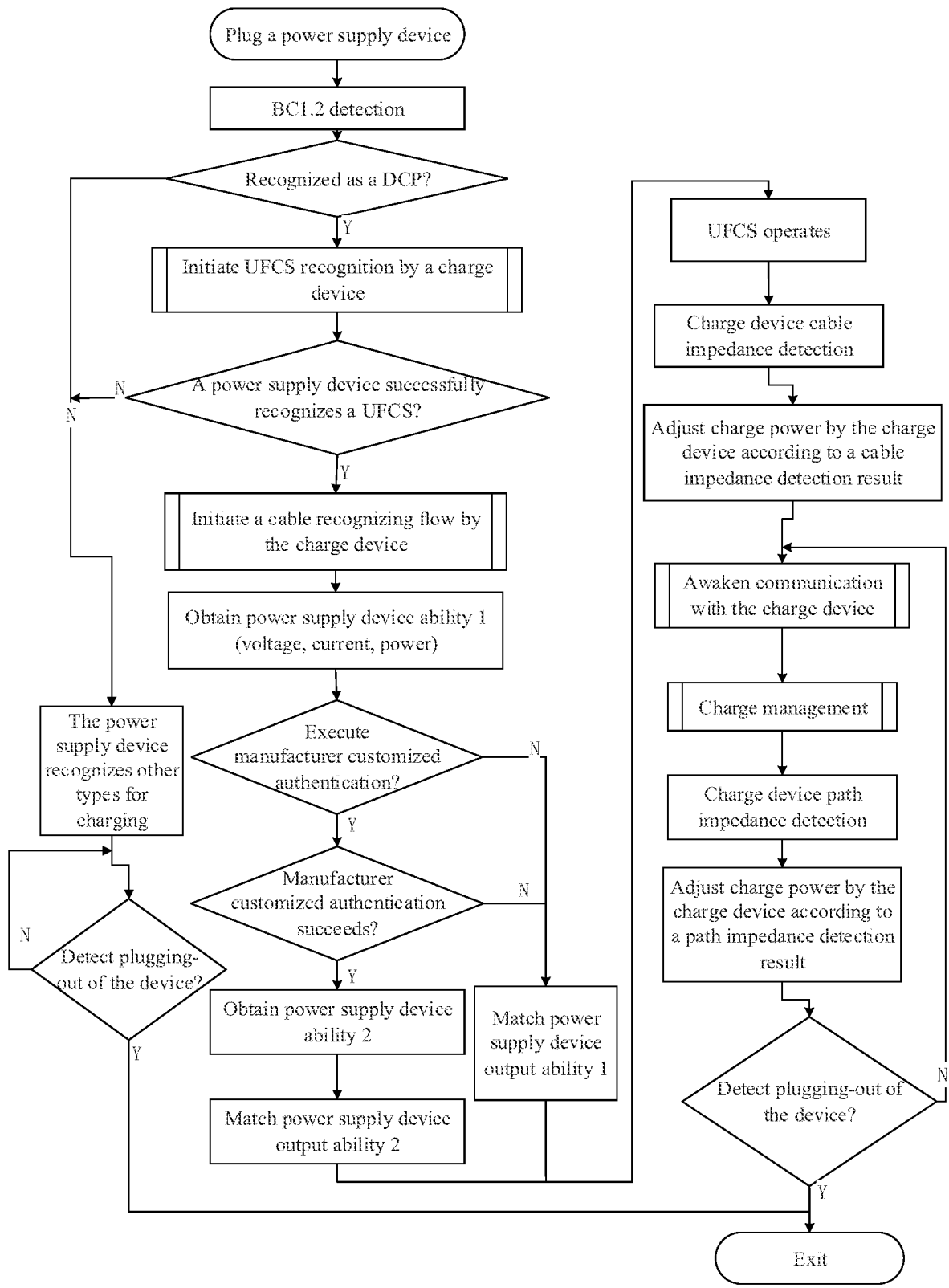
FIG. 18 is a flow diagram of a charge control method illustrated according to another example of the disclosure.

FIG. 18 is a flow diagram of a charge control method illustrated according to another example of the disclosure. As shown in FIG. 18, the charge control method is applied to a charge device. In response to plugging-in of a power supply device, communication connection between the charge device and the power supply device is established. In a process of detecting a charge protocol, whether the charge device supports a DCP mode in a BC1.2 protocol is determined first, so as to determine whether the power supply device adopted for current charging is a dedicated charge device for the charge device. If yes, UFCS recognition is performed on the charge device, and whether the power supply device accords with a UFCS is judged. When the power supply device accords with the UFCS, the charge device can read electronic tag information of a cable. If reading fails, the power supply device is switched to read the electronic tag information of the cable. When it is determined that the charge device performs cable recognition, the charge device obtains cable information. Power supply device ability information 1 is obtained. The power supply device ability information 1 includes voltage information, current information, power information, etc. of the power supply device.

The charge device determines initial charge power based on device ability information of the power supply device, device ability information of a charge cable and device ability information of the charge device.

If it is determined that the charge device determines manufacturer information and it is determined that a condition is met based on the manufacturer information of the power supply device and the manufacturer information of the charge device, a power supply device ability 2 is obtained, and matching the power supply device ability 2, the charge device is charged with charge power which is greater than initial charge power and smaller than a charge power threshold. If the charge device does not determine the manufacturer information, or the charge device determines that the condition of improving the charge power is not met based on the manufacturer information of the power supply device and the manufacturer information of the charge device, the charge device matches initial charge power of a power supply device ability 1 and performs charge control based on the initial charge power.

In order to ensure safe use of the charge cable in the charging process, the charge device detects cable impedance to avoid dangers caused by cable aging. In a process of performing charge control, if a charge output current is greater than a preset current threshold, the charge device is controlled to periodically obtain impedance information of the charge cable. In a process of performing charge control based on a charge control strategy, if transmission of communication between the charge device and the power supply device times out, a timeout protection function is started to control the charge device and the power supply device to perform communication in a data frame having communication transmission timeout again and/or perform data packet transmission communication.

According to the example of the disclosure, the power supply device and the charge device are connected, and when the selected charge protocol is the UFCS, charge control is performed based on the charge control strategy matching the UFCS, improving the universal adaptability between the power supply device and the charge device.

Figure 19:
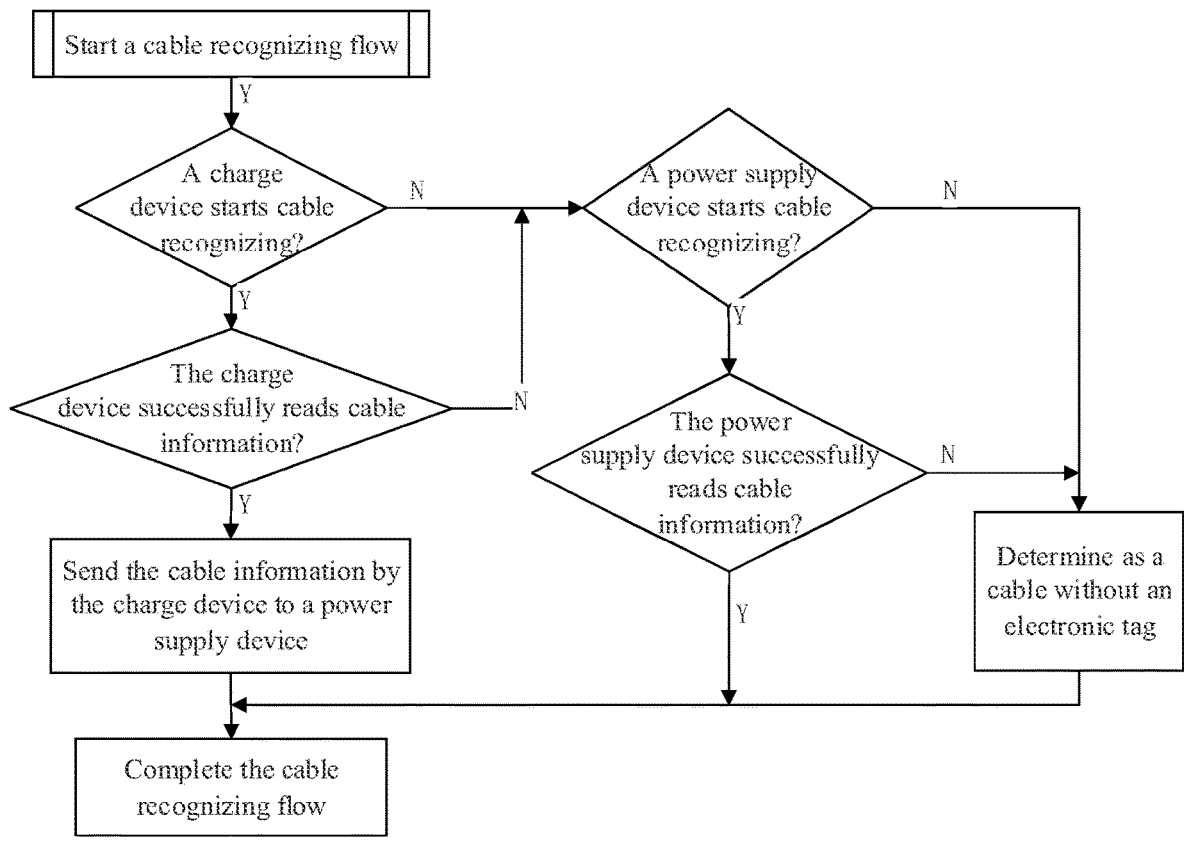
FIG. 19 is a flow diagram of obtaining information of a charge cable by a power supply device illustrated according to an example of the disclosure.

FIG. 19 is a flow diagram of obtaining the information of the charge cable by the power supply device illustrated according to an example of the disclosure. As shown in FIG. 19, in the process of charging based on the UFCS, after the charge device successfully recognizes the UFCS, the charge device can read the electronic tag information of the cable. If the charge device fails to read, the power supply device is switched to read the electronic tag information of the cable. The charge cable recognizing flow is started, and if the charge device starts cable recognition communication and the charge device successfully reads the electronic tag information of the cable, the charge device sends the electronic tag information of the cable to the power supply device, so that the cable recognizing flow is completed. A maximum charge power threshold which is supported by the charge device and the power supply device and greater than the initial charge power is determined, and the charge device is charged with charge power which is greater than the initial charge power and smaller than the maximum charge power threshold.

If the charge device does not start cable recognition communication, it is determined that the power supply device reads the electronic tag information of the cable, whether the power supply device starts cable recognition communication is judged, and if the power supply device starts cable recognition communication and the power supply device successfully reads the electronic tag information of the cable, the cable recognizing flow is completed. If the power supply device does not start cable recognition communication, or the power supply device starts cable recognition communication but fails to read the electronic tag information of the cable, it is determined that there is no cable electronic information tag, and the cable recognizing flow is completed. The initial charge power is determined based on the device ability information of the power supply device, the device ability information of the charge cable and the device ability information of the charge device, and charge control is performed based on the initial charge power.

According to the example of the disclosure, the power supply device and the charge device are connected, and when the selected charge protocol is the UFCS, charge control is performed based on the charge control strategy matching the UFCS, improving the universal adaptability between the power supply device and the charge device.

Based on the same concept, an example of the disclosure further provides a charge control apparatus.

It can be understood that the apparatus provided by the example of the disclosure includes a hardware structure and/or software module corresponding to performing each function in order to realize the above functions. In combination with units and algorithm steps of each instance disclosed in the example of the disclosure, the example of the disclosure can be implemented in the form of hardware or a combination of hardware and computer software. Whether a function is performed by hardware or computer software driving hardware depends on the specific application and design constraints of the technical solutions. Those skilled in the art can use different methods to implement the described functions for each specific application, but such implementation should not be considered to be beyond the scope of the technical solutions of the examples of the disclosure.

Figure 20:
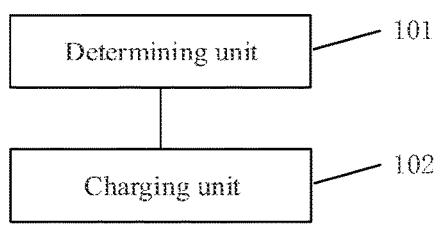
FIG. 20 is a block diagram of a charge control apparatus illustrated according to an example of the disclosure.

FIG. 20 is a block diagram of a charge control apparatus illustrated according to an example of the disclosure. Referring to FIG. 20, the charge control apparatus 100 includes a determining unit 101 and a charging unit 102.

The determining unit 101 is configured to, in response to connection with a charge device, select a charge protocol, and when the selected charge protocol is a universal fast charge specification, determine a charge control strategy matching the universal fast charge specification.

The charging unit 102 is configured to charge the charge device based on the charge control strategy.

In an example, selecting the charge protocol includes: if the power supply device obtains a universal fast charge specification packet internet groper data packet sent by the charge device and sends a correct acknowledgement data packet based on the universal fast charge specification packet internet groper data packet, it is determined that the charge device and the power supply device successfully shake hands based on the universal fast charge specification, it is determined that a differential data cable tag is set as a universal fast charge physical property tag, and the selected charge protocol is determined as the universal fast charge specification.

In an example, the determining unit 101 determines the charge control strategy matching the universal fast charge specification as follows to charge the charge device based on the charge control strategy: first device ability information of the power supply device is sent to the charge device, the first device ability information being determined based on ability information of the power supply device and device ability information of a charge cable; and an initial charge power demand sent by the charge device is received, initial charge power matching the initial charge power demand is determined, and the charge device is charged based on the initial charge power. The initial charge power demand is determined by the charge device based on the first device ability information of the power supply device and device ability information of the charge device.

In an example, the determining unit 101 determines the device ability information of the charge cable as follows: electronic tag information of the charge cable is recognized, and the device ability information of the charge cable is determined based on the electronic tag information.

In an example, the determining unit 101 determines the charge control strategy matching the universal fast charge specification as follows to charge the charge device based on the charge control strategy: in response to that the charge device initiates manufacturer customized information authentication, a manufacturer customized information authentication result is determined, the manufacturer customized information authentication result including an authentication result of whether a charge device manufacturer and a power supply device manufacturer are consistent or not; if the charge device manufacturer and the power supply device manufacturer are consistent, second device ability information of the power supply device is determined based on the authentication result and the first device ability information of the charge cable; the second device ability information of the power supply device is sent to the charge device, and the initial charge power demand sent by the charge device is received; and the initial charge power matching the initial charge power demand is determined, and the charge device is charged based on the initial charge power. The initial charge power demand is determined by the charge device based on the second device ability information of the power supply device and the device ability information of the charge device.

Figure 21:
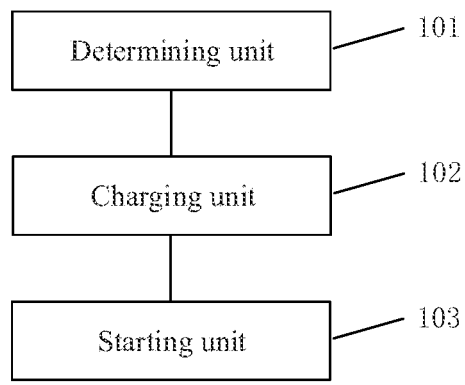
FIG. 21 is a block diagram of a charge control apparatus illustrated according to another example of the disclosure.

FIG. 21 is a block diagram of a charge control apparatus illustrated according to another example of the disclosure. Referring to FIG. 21, the charge control apparatus 100 further includes a starting unit 103.

The starting unit 103 is configured to, in a process of charging the charge device based on the charge control strategy, when transmission of communication with the charge device times out, start a communication timeout protection function. The communication timeout protection function is configured to control the charge device and the power supply device to perform communication in a data frame having communication transmission timeout again and/or perform data packet transmission communication having communication transmission timeout again.

In an example, the determining unit 101 is further configured to: when a universal fast charge specification exiting instruction sent by the charge device is received, or plugging-out of the charge device is detected, set the differential data cable tag as a BC1.2 physical property tag, set an output voltage of a differential data cable within a default voltage range, and send an acknowledgement instruction of having been exited the universal fast charge specification to the charge device.

Figure 22:
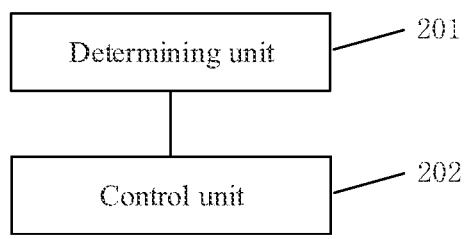
FIG. 22 is a block diagram of a charge control apparatus illustrated according to an example of the disclosure.

FIG. 22 is a block diagram of a charge control apparatus illustrated according to an example of the disclosure. The charge control apparatus is applied to a charge device. Referring to FIG. 22, the charge control apparatus 200 includes a determining unit 201 and a control unit 202.

The determining unit 201 is configured to, in response to connection with a power supply device, detect a charge protocol, and when it is detected that the charge device and the power supply device both support a universal fast charge specification, determine a charge control strategy matching universal fast charge specification.

The control unit 202 is configured to perform charge control based on the charge control strategy.

In an example, the determining unit 201 detects that the charge device and the power supply device both support the universal fast charge specification as follows: if, under a dedicated charge port (DCP) protocol state, it is recognized that a charge protocol supported by the charge device is the universal fast charge specification and it is determined that the power supply device supports the universal fast charge specification, it is determined that the charge device and the power supply device both support the universal fast charge specification.

In an example, the determining unit 201 determines that the power supply device supports the universal fast charge specification as follows: a packet internet groper data packet of the universal fast charge specification is sent to the power supply device; and if a correct acknowledgement data packet of the universal fast charge specification packet internet groper data packet sent by the power supply device is received, it is determined that the power supply device supports the universal fast charge specification.

In an example, the control unit 202 performs charge control based on the charge control strategy as follows: first device ability information of the power supply device sent by the power supply device is obtained, and device ability information of the charge device is determined; an initial charge power demand is determined based on the first device ability information of the power supply device and the device ability information of the charge device, and the initial charge power demand is sent to the power supply device; and initial charge power determined by the power supply device based on the initial charge power demand is obtained, and charge control is performed based on the initial charge power.

In an example, the determining unit 201 determines device ability information of a charge cable as follows: electronic tag information of the charge cable is recognized; the device ability information of the charge cable is determined based on the electronic tag information; and the device ability information of the charge cable is sent to the power supply device.

In an example, the determining unit 201 determines the device ability information of the charge cable as follows: if the charge device does not start recognizing electronic tag information of the charge cable, or recognizing the electronic tag information of the charge cable by the charge device fails, the power supply device is controlled to obtain the device ability information of the charge cable.

In an example, the control unit 202 performs charge control based on the charge control strategy as follows: manufacturer customized information authentication is initiated; second device ability information of the power supply device sent by the power supply device is obtained, and device ability information of the charge device is determined; an initial charge power demand is determined based on the second device ability information of the power supply device and the device ability information of the charge device, and the initial charge power demand is sent to the power supply device; and initial charge power determined by the power supply device based on the initial charge power demand is obtained, and charge control is performed based on the initial charge power.

In an example, the control unit 202 is further configured to: in a process of performing charge control based on the charge control strategy, if a charge output current is greater than a preset current threshold, periodically obtain impedance information of the charge cable; and adjust charge power based on the obtained impedance information of the charge cable, and perform charge control based on the adjusted charge power.

Figure 23:
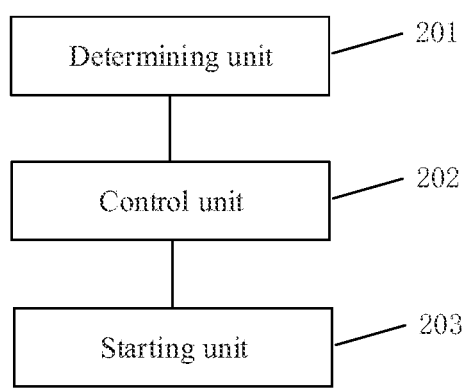
FIG. 23 is a block diagram of a charge control apparatus illustrated according to another example of the disclosure.

FIG. 23 is a block diagram of a charge control apparatus illustrated according to another example of the disclosure. Referring to FIG. 23, the charge control apparatus 200 further includes a starting unit 203.

The starting unit 203 is configured to, in a process of performing charge control based on the charge control strategy, when transmission of communication with the power supply device times out, start a communication timeout protection function. The communication timeout protection function is configured to control the charge device and the power supply device to perform communication in a data frame having communication transmission timeout again and/or perform data packet transmission communication having communication transmission timeout again.

As for the apparatus in the above examples, the specific manner in which each module performs operations has been described in detail in the examples of the method, and detailed description will not be given here.

Figure 24:
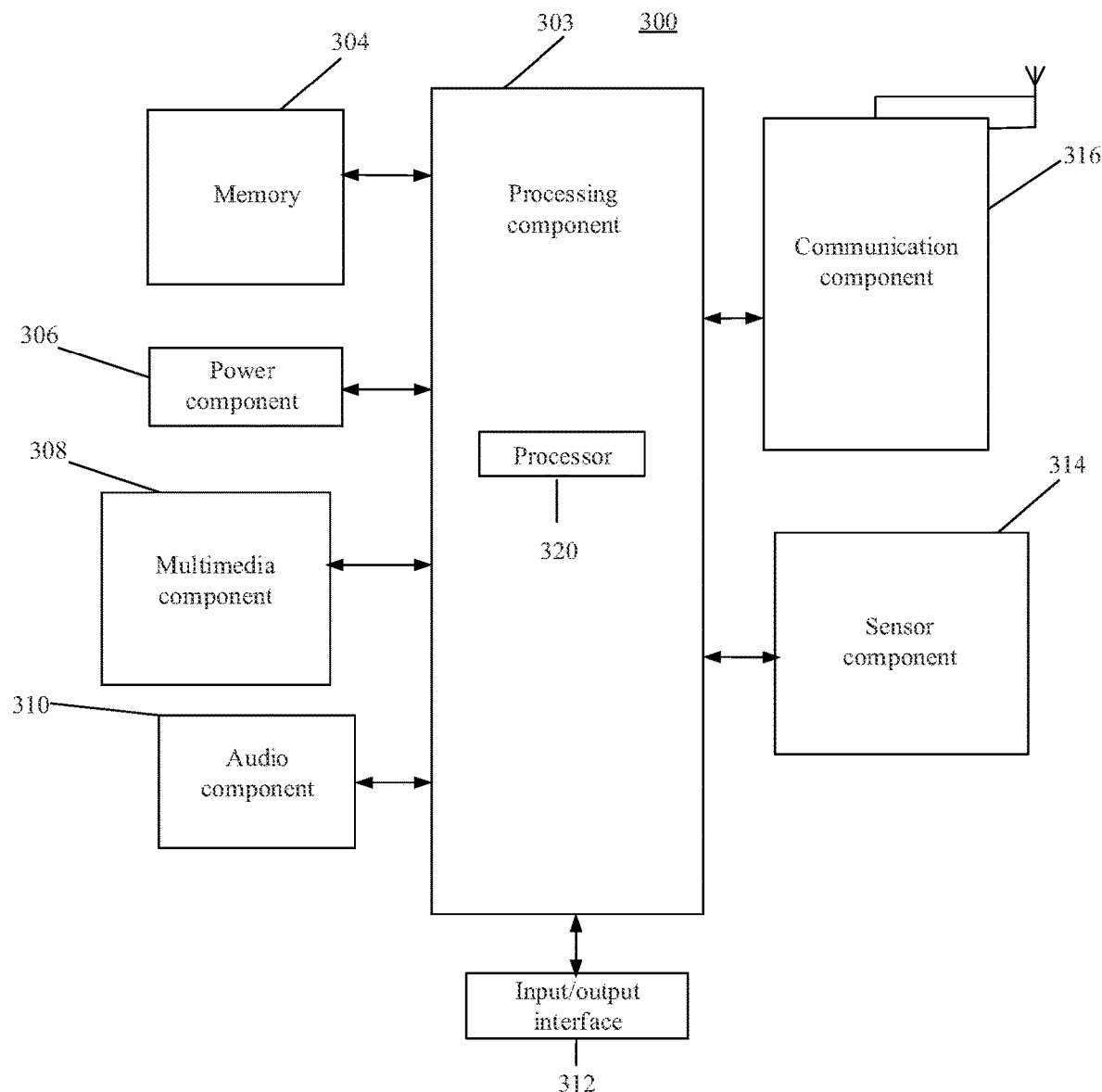
FIG. 24 is a block diagram of an apparatus for charge control illustrated according to an example of the disclosure.

FIG. 24 is a block diagram of an apparatus 300 for charge control illustrated according to an example of the disclosure. For example, the apparatus 300 may be a mobile phone, a computer, a digital broadcasting terminal, a messaging device, a game console, a tablet device, a medical device, a fitness device, a personal digital assistant, etc.

Referring to FIG. 24, the apparatus 300 may include one or more of the following components: a processing component 303, a memory 304, a power component 306, a multimedia component 308, an audio component 310, an input/output (I/O) interface 312, a sensor component 314, and a communication component 316.

The processing component 303 typically controls the overall operation of the apparatus 300, such as operations associated with display, telephone call, data communication, camera operations, and recording operations. The processing component 303 may include one or more processors 320 to execute instructions to complete all or part of the steps of the above method. In addition, the processing component 303 may include one or more modules to facilitate interaction between the processing component 303 and other components. For example, the processing component 303 may include a multimedia module to facilitate interaction between the multimedia component 308 and the processing component 303.

The memory 304 is configured to store various types of data to support operations at the apparatus 300. Instances of these data include instructions for any application or method operating on the apparatus 300, contact data, phonebook data, messages, pictures, videos, etc. The memory 304 may be implemented by any type of volatile or nonvolatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or optic disk.

The power component 306 provides power for various components of the apparatus 300. The power component 306 may include a power management system, one or more power sources and other components associated with generating, managing and distributing power for the apparatus 300.

The multimedia component 308 includes a screen providing an output interface between the apparatus 300 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, sliding and gestures on the touch panel. The touch sensor can not only sense the boundary of the touch or sliding operation, but also detect the duration and pressure related to the touch or sliding operation. In some examples, the multimedia component 308 includes a front camera and/or a rear camera. When the apparatus 300 is in an operation mode, such as a shooting mode or a video mode, the front camera and/or the rear camera can receive external multimedia data. Each front camera and rear camera may be a fixed optical lens system or have a focal length and optical zoom capability.

The audio component 310 is configured to output and/or input audio signals. For example, the audio component 310 includes a microphone (MIC) configured to receive an external audio signal when the apparatus 300 is in the operation mode, such as a call mode, a recording mode, and a speech recognition mode. The received audio signal may be further stored in the memory 304 or transmitted via the communication component 316. In some examples, the audio component 310 also includes a speaker for outputting an audio signal.

The I/O interface 312 provides an interface between the processing component 303 and a peripheral interface module which can be a keyboard, a click wheel, a button, etc. These buttons may include but are not limited to: a home button, volume buttons, a start button and a lock button.

The sensor component 314 includes one or more sensors for providing state evaluation of various aspects of the apparatus 300. For example, the sensor component 314 can detect an on/off state of the apparatus 300 and the relative positioning of the components, for example, the component is a display and a keypad of the apparatus 300. The sensor component 314 can also detect the change of the position of the apparatus 300 or one component of the apparatus 300, the presence or absence of user contact with the apparatus 300, the azimuth or acceleration/deceleration of the apparatus 300, and temperature change of the apparatus 300. The sensor component 314 may include a proximity sensor configured to detect the presence of nearby objects without any physical contact. The sensor component 314 may further include an optical sensor, such as a CMOS or CCD image sensor, for use in imaging applications. In some examples, the sensor component 314 may further include an acceleration sensor, a gyroscope sensor, a magnetic sensor, a pressure sensor, or a temperature sensor.

The communication component 316 is configured to facilitate wired or wireless communication between the apparatus 300 and other devices. The apparatus 300 may access a wireless network based on a communication standard, such as WiFi, 3G or 5G, or a combination thereof. In an example, the communication component 316 receives a broadcast signal or broadcast-related information from an external broadcast management system via a broadcast channel. In an example, the communication component 316 further includes a near field communication (NFC) module to facilitate short-range communication. For example, the NFC module may be implemented based on radio frequency identification (RFID) technology, infrared data association (IrDA) technology, ultra wideband (UWB) technology, Bluetooth (BT) technology and other technologies.

In an example, the apparatus 300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements for performing the above method.

In an example, a non-temporary computer-readable storage medium including instructions, such as the memory 304 including instructions, which can be executed by the processor 320 of the apparatus 300 to complete the above method, is also provided. For example, the non-temporary computer-readable storage medium may be a ROM, a random access memory (RAM), a CD-ROM, a magnetic tape, a floppy disk, an optical data storage device, etc.

It can be understood that "a plurality of" in the disclosure refers to two or more, and other quantifiers are similar. "And/or" describes the association relationship of associated objects, which means that there can be three kinds of relationships, for example, A and/or B can mean that there are three kinds of situations: A alone, A and B at the same time, and B alone. The character "/" universally indicates that associated objects are in an "or" relationship. The singular forms "one", "said" and "the" are also intended to include the majority forms unless the context clearly indicates other meanings.

It can be further understood that the terms "first", "second" and the like are used to describe various information, but the information should not be limited to these terms. These terms are only used to distinguish the same type of information from each other, and do not indicate a specific order or importance. In fact, the expressions "first" and "second" can be used interchangeably. For example, without departing from the scope of the disclosure, first information may also be referred to as second information, and similarly, the second information may also be referred to as the first information.

It can be further understood that unless otherwise specified, "connection" includes the direct connection between the two without other members, and also includes the indirect connection between the two with other elements.

It can be further understood that in the examples of the disclosure, although the operations are described in a specific order in the drawings, it should not be understood as requiring these operations to be performed in the specific order or serial order shown, or requiring all the operations shown to be performed to achieve the desired results. Multitasking and parallel processing may be advantageous in a particular environment.

Other implementations of the disclosure will be apparent to those skilled in the art from consideration of the specification and practice of the disclosure herein. Examples may cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes may be made without departing from the scope thereof. It is intended that the scope of the disclosure only be limited by the appended claims.

The invention claimed is:

1. A charge control method, applied to a power supply device and comprising:
   in response to connection with a charge device, selecting a charge protocol;
   when the selected charge protocol is a universal fast charge specification, determining a charge control strategy matching the universal fast charge specification, and charging the charge device based on the charge control strategy,
   wherein selecting the charge protocol comprises:
      when the power supply device obtains a universal fast charge specification packet internet groper data packet sent by the charge device and sends a correct acknowledgement data packet based on the universal fast charge specification packet internet groper data packet, determining that the charge device and the power supply device successfully shake hands based on the universal fast charge specification, determining that a differential data cable tag is set as a universal fast charge physical property tag, and determining the selected charge protocol as the universal fast charge specification.

2. The charge control method according to claim 1, wherein determining the charge control strategy matching the universal fast charge specification, and charging the charge device based on the charge control strategy, comprise:
   sending first device ability information of the power supply device to the charge device, wherein the first device ability information is determined based on ability information of the power supply device and device ability information of a charge cable; and
   receiving an initial charge power demand sent by the charge device, determining initial charge power matching the initial charge power demand, and charging the charge device based on the initial charge power; wherein
   the initial charge power demand is determined by the charge device based on the first device ability information of the power supply device and device ability information of the charge device.

3. The charge control method according to claim 2, wherein the device ability information of the charge cable is determined by:
   recognizing electronic tag information of the charge cable, and determining the device ability information of the charge cable based on the electronic tag information.

4. The charge control method according to claim 2, wherein determining the charge control strategy matching the universal fast charge specification, and charging the charge device based on the charge control strategy, comprise:
   in response to that the charge device initiating manufacturer customized information authentication, determining a manufacturer customized information authentication result, the manufacturer customized information authentication result comprising an authentication result of whether a charge device manufacturer and a power supply device manufacturer are consistent or not;

when the charge device manufacturer and the power supply device manufacturer are consistent, determining second device ability information of the power supply device based on the authentication result and the first device ability information of the charge cable;

sending the second device ability information of the power supply device to the charge device, and receiving the initial charge power demand sent by the charge device; and determining the initial charge power matching the initial charge power demand, and charging the charge device based on the initial charge power; wherein the initial charge power demand is determined by the charge device based on the second device ability information of the power supply device and the device ability information of the charge device.

5. The charge control method according to claim 1, further comprising:

in a process of charging the charge device based on the charge control strategy, when transmission of communication with the charge device times out, starting a communication timeout protection function, the communication timeout protection function is used for controlling the charge device and the power supply device to perform communication in a data frame having communication transmission timeout again or perform data packet transmission communication having communication transmission timeout again.

6. The charge control method according to claim 1, further comprising:

when a universal fast charge specification exiting instruction sent by the charge device is received, or plugging-out of the charge device is detected, setting the differential data cable tag as a BC1.2 physical property tag, setting an output voltage of the differential data cable within a default voltage range, and sending an acknowledgement instruction of having been exited the universal fast charge specification to the charge device.

7. A non-transitory computer-readable storage medium storing executable instructions that, when executed by a processor of a mobile terminal, cause the mobile terminal to perform the charge control method according to claim 1.

8. A charge control method, applied to a charge device and comprising:

in response to connection with a power supply device, detecting a charge protocol;

when it is detected that the charge device and the power supply device both support a universal fast charge specification, determining a charge control strategy matching the universal fast charge specification; and performing charge control based on the charge control strategy, wherein detecting that the charge device and the power supply device both support the universal fast charge specification comprises:

when, under a dedicated charge port (DCP) protocol state, it is recognized that a charge protocol supported by the charge device is the universal fast charge specification and it is determined that the power supply device supports the universal fast charge specification, determining that the charge device and the power supply device both support the universal fast charge specification; and wherein determining that the power supply device supports the universal fast charge specification comprises:

sending a packet internet groper data packet of the universal fast charge specification to the power supply device; and when a correct acknowledgement data packet of a universal fast charge specification packet internet groper data packet sent by the power supply device is received, determining that the power supply device supports the universal fast charge specification.

9. The charge control method according to claim 8, wherein performing charge control based on the charge control strategy comprises:

obtaining first device ability information of the power supply device sent by the power supply device, and determining device ability information of the charge device;

determining an initial charge power demand based on the first device ability information of the power supply device and the device ability information of the charge device, and sending the initial charge power demand to the power supply device; and obtaining initial charge power determined by the power supply device based on the initial charge power demand, and performing charge control based on the initial charge power.

10. The charge control method according to claim 9, wherein determining device ability information of a charge cable comprises:

recognizing electronic tag information of the charge cable, and determining the device ability information of the charge cable based on the electronic tag information; and sending the device ability information of the charge cable to the power supply device.

11. The charge control method according to claim 9, wherein determining device ability information of a charge cable comprises:

when the charge device does not start recognizing electronic tag information of the charge cable, or recognizing the electronic tag information of the charge cable by the charge device fails, controlling the power supply device to obtain the device ability information of the charge cable.

12. The charge control method according to claim 9, further comprising:

in a process of performing charge control based on the charge control strategy, when a charge output current is greater than a preset current threshold, periodically obtaining impedance information of a charge cable;

performing charge control based on the charge control strategy comprises:

adjusting charge power based on the obtained impedance information of the charge cable, and performing charge control based on the adjusted charge power.

13. The charge control method according to claim 8, wherein performing charge control based on the charge control strategy comprises:

initiating manufacturer customized information authentication;

obtaining second device ability information of the power supply device sent by the power supply device, and determining device ability information of the charge device;

determining an initial charge power demand based on the second device ability information of the power supply device and the device ability information of the charge device, and sending the initial charge power demand to the power supply device; and obtaining initial charge power determined by the power supply device based on the initial charge power demand, and performing charge control based on the initial charge power.

14. The charge control method according to claim 8, further comprising:

in a process of performing charge control based on the charge control strategy, when transmission of communication with the power supply device times out, starting a communication timeout protection function, the communication timeout protection function is used for controlling the charge device and the power supply device to perform communication in a data frame having communication transmission timeout again or perform data packet transmission communication having communication transmission timeout again.

15. A charge control apparatus, comprising:

a processor; and a memory configured to store processor-executable instructions; wherein the processor, when executing the instructions, is configured to perform the charge control method according to claim 8.

16. A non-transitory computer-readable storage medium storing executable instructions that, when executed by a processor of a mobile terminal, cause the mobile terminal to perform the charge control method according to claim 8.

17. A charge control apparatus, comprising:

a processor; and a memory, configured to store processor-executable instructions; wherein the processor, when executing the instructions, is configured to:

in response to connection with a charge device, select a charge protocol; and when the selected charge protocol is a universal fast charge specification, determine a charge control strategy matching the universal fast charge specification, and charge the charge device based on the charge control strategy, wherein the processor is further configured to:

when a power supply device obtains a universal fast charge specification packet internet groper data packet sent by the charge device and sends a correct acknowledgement data packet based on the universal fast charge specification packet internet groper data packet, determine that the charge device and the power supply device successfully shake hands based on the universal fast charge specification, determine that a differential data cable tag is set as a universal fast charge physical property tag, and determine the selected charge protocol as the universal fast charge specification.

\* \* \* \* \*